(12) United States Patent
Garcia-Luna-Aceves et al.

(10) Patent No.: US 6,996,074 B2
(45) Date of Patent: Feb. 7, 2006

(54) RECEIVER-INITIATED MULTIPLE ACCESS FOR AD-HOC NETWORKS (RIMA)

(75) Inventors: Jose Joaquin Garcia-Luna-Aceves, San Mateo, CA (US); Asimakis Tzamaloukas, Sunnyvale, CA (US)

(73) Assignee: The Regents of the University of California, Oakland, CA (US)

( * ) Notice: Subject to any disclaimer, the term of this patent is extended or adjusted under 35 U.S.C. 154(b) by 944 days.

(21) Appl. No.: 09/928,221

(22) Filed: Aug. 10, 2001

(65) Prior Publication Data

US 2002/0080768 A1    Jun. 27, 2002

Related U.S. Application Data

(60) Provisional application No. 60/225,019, filed on Aug. 11, 2000.

(51) Int. Cl.
*H04B 7/005* (2006.01)
*H04L 12/413* (2006.01)

(52) U.S. Cl. .................. 370/278; 370/445; 370/462
(58) Field of Classification Search .............. 370/445, 370/346, 446, 442, 461, 462, 463, 431, 329, 370/278, 236, 229
See application file for complete search history.

(56) References Cited

U.S. PATENT DOCUMENTS

| | | | |
|---|---|---|---|
| 5,502,724 A * | 3/1996 | Chen et al. | 370/445 |
| 5,784,375 A | 7/1998 | Kalkunte et al. | |
| 5,844,905 A * | 12/1998 | McKay et al. | 370/443 |
| 5,854,900 A | 12/1998 | Kalkunte et al. | |
| 5,963,560 A | 10/1999 | Kalkunte | |
| 6,118,787 A | 9/2000 | Kalkunte et al. | |
| 6,141,327 A | 10/2000 | Kalkunte et al. | |
| 6,556,582 B1 * | 4/2003 | Redi | 370/443 |
| 2001/0055312 A1 * | 12/2001 | Negus | 370/445 |

OTHER PUBLICATIONS

MACA-BI (MACA by invitation). A wireless MAC protocol for high speed ad hoc networking Talucci, F.; Gerla, M.; Universal Personal Communications Record, 1997. Conference Record., 1997 IEEE 6th International Conference on vol. 2, Oct. 12-16, 1997 Page(s).*

Performance of floor acquisition multiple access in ad-hoc networks Garcia-Luna-Aceves, J.J.; Fullmer, C.L.; Computers and Communications, 1998. ISCC '98. Proceedings. Third IEEE Symposium on Jun. 30-Jul. 2, 1998 Page(s):63-68.*

(Continued)

*Primary Examiner*—Hassan Kizou
*Assistant Examiner*—Brian Roberts
(74) *Attorney, Agent, or Firm*—John P. O'Banion

(57) ABSTRACT

Receiver-initiated collision avoidance methods for use in ad-hoc wireless networks in which carrier sensing is available. A number of protocol variants are described including RIMA-SP (simple polling), RIMA-DP (dual-purpose polling), and RIMA-BP (broadcast polling). These handshake methods according to the invention are capable of correctly avoiding collisions within a network that contains hidden nodes, and the RIMA-DP protocol provides higher performance levels than attainable with existing handshaking protocols within the ad-hoc wireless networks. The use of dual-purpose polling allows a control packet to be sent which has alternative functions, such as requesting data from the polled node, if available, and if not available then providing a transmission request from the polling node to send data to the polled node.

18 Claims, 14 Drawing Sheets

OTHER PUBLICATIONS

Complete single-channel solutions to hidden terminal problems in wireless LANs Fullmer, C.L.; Garcia-Luna-Aceves, J.J.; Communications, 1997. ICC 97 Montreal, 'Towards the Knowledge Millennium'. 1997 IEEE International Conference on vol. 2, 8-12 Jun. 1.*

Channel-hopping multiple access Tzamaloukas, A.; Garcia-Luna-Aceves, J.J.; Communications, 2000. ICC 2000. 2000 IEEE International Conference on vol. 1, Jun. 18-22, 2000 Page(s):415-419 vol. 1.*

MACA-BI (MACA By Invitation)-a receiver oriented access protocol for wireless multihop networks Talucci, F.; Gerla, M.; Fratta, L.; the 8the IEEE International Symposium on vol. 2, Sep. 1-4, 1997 Page(s)L435-439 vol. 2.*

Poll-before-data multiple access Tzamaloukas, A.; Garcia-Luna-Aceves, J.J.; Communications, 1999. ICC '99. 1999 IEEE International Conference on vol. 2, Jun. 6-10, 1999 Page(s):1207 1211 vol. 2.*

Solutions to Hidden Terminal Problems in Wireless Networks Fullmer, C.L.; Garcia-Luna-Aceves, J.J.: SIGCOMM '97 con Oct. 1997 vol. 27 Issue 4 pp.: 39-49.*

* cited by examiner

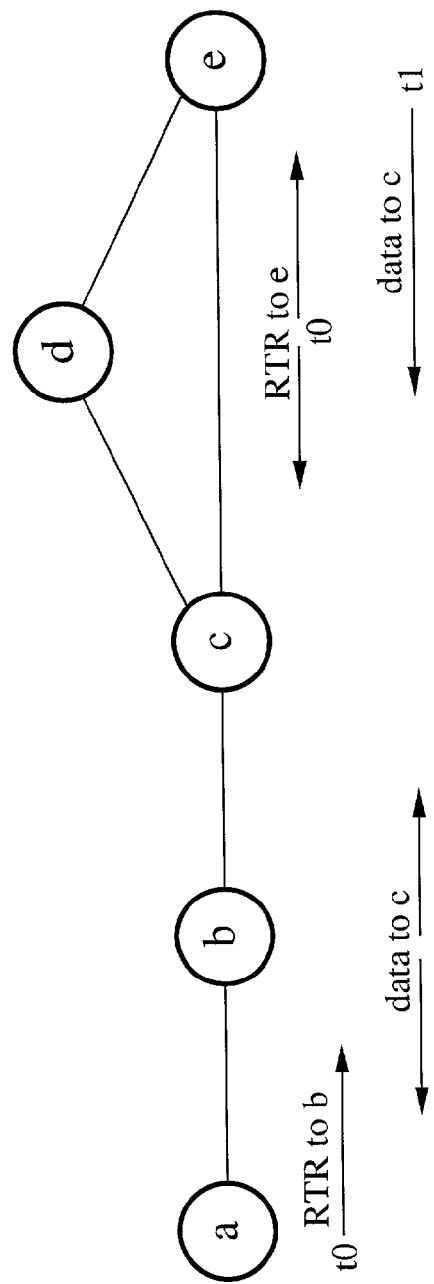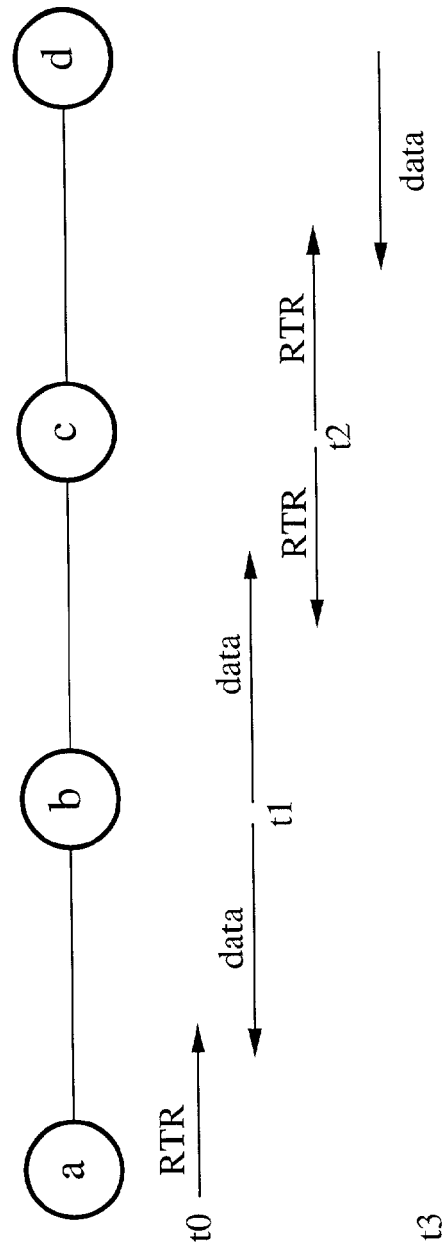
FIG. 1
FIG. 2

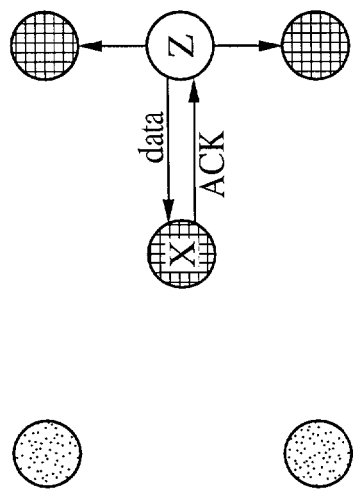
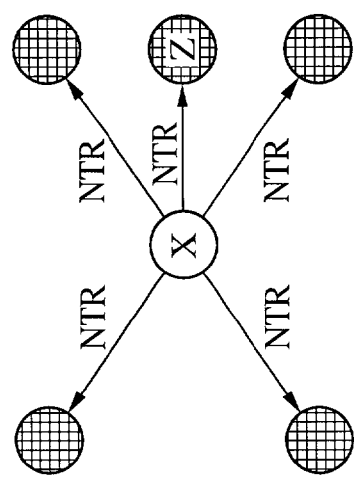
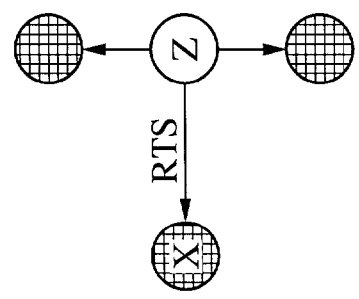
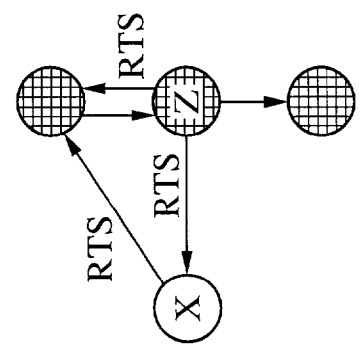
FIG. 5A
FIG. 5B
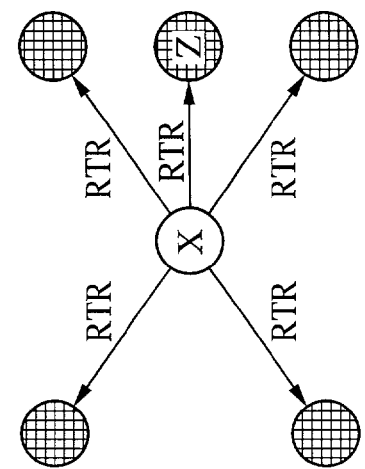
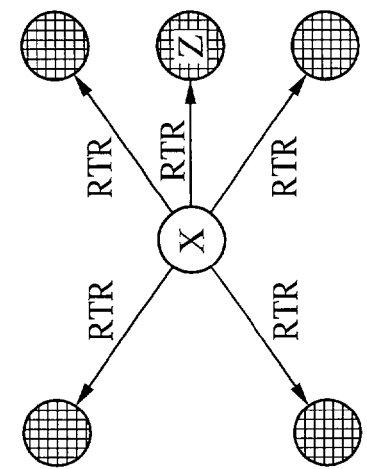

RECEIVER-INITIATED MULTIPLE ACCESS FOR AD-HOC NETWORKS (RIMA)

CROSS-REFERENCE TO RELATED APPLICATIONS

This application claims priority from U.S. provisional application Ser. No. 60/225,019 filed on Aug. 11, 2000, incorporated herein by reference.

STATEMENT REGARDING FEDERALLY SPONSORED RESEARCH OR DEVELOPMENT

This invention was made with Government support under Grant No. F30602-97-2-0338, awarded by the Air Force Office of Scientific Research (AFOSR). The Government has certain rights in this invention.

REFERENCE TO A COMPUTER PROGRAM APPENDIX

Not Applicable

BACKGROUND OF THE INVENTION

1. Field of the Invention

The invention pertains generally to wireless ad-hoc networking, and more particularly to a medium access control protocol that provides correct collision-avoidance in wireless networks in which hidden terminals may exist.

2. Description of the Background Art

As the use of wireless systems become increasingly important, attention is being focused on a variety of wireless network protocols. A large body of work exists on the design of medium access control (MAC) protocols for wireless networks having hidden terminals. A number of problems have been identified with existing and proposed wireless protocols. One problems is the hidden-terminal problem of carrier sensing which reduces the performance of the carrier-sense multiple access (CSMA) protocol to that of the pure ALOHA protocol when the senders of packets are unable to hear one another, wherein the vulnerability period of packets extends to twice a packet length. The BTMA (busy tone multiple access) protocol was an early attempt to solve the hidden-terminal problem by introducing a separate busy tone channel. In addition, SRMA (split-channel reservation multiple access) was proposed for avoiding collisions by introducing a control-signal handshake between the sender and the receiver. A station in need of transmitting data to a receiver is thereby required to first send a request-to-send (RTS) signal packet to the receiver, wherein the receiver should respond by sending a clear-to-send (CTS) signal if it receives the RTS correctly. Therefore, a sender transmits a data packet only after successful receipt of a CTS. ALOHA and CSMA can be utilized by senders to transmit RTS signal packets.

A number of variations of SRMA have been proposed, and or developed, including MACA, MACAW, IEEE 802.11, FAMA, and so forth. These example protocols and the majority of protocols which are based on collision-avoidance handshakes are designed as sender-initiated protocols in which the node that wants to send a data packet must first gain permission from the receiver by transmitting an RTS and receiving a CTS. In contrast, when utilizing the MACA by invitation (MACA-BI) protocol the receiver polls one of its neighbors asking if it has a packet to send. A reduction in control traffic is an attractive theoretical benefit that could be derived from the use of a receiver-initiated protocol. However, the MACA-BI protocol when utilized in a wireless network is unable to prevent data packet collisions within networks containing hidden terminals.

It will be appreciated, therefore, that a need exists for a wireless protocol that is capable of garnering the benefits of a receiver-initiated protocol while avoiding packet collision within networks which contain hidden terminals. The present invention satisfies those needs, as well as others, and overcomes the deficiencies of previously developed wireless network protocols.

BRIEF SUMMARY OF THE INVENTION

A method of handshaking between nodes within a medium access control protocol is described utilizing dual purpose polling that overcomes the packet collision problems within existing receiver-initiated protocols on networks in which one or more hidden terminals exist. The protocol methods of the present invention allow the collision-avoidance dialogues to be recast for control by senders, receivers, or both. Utilization of the resulting receiver-initiated collision-avoidance methods provide increased efficiency over sender-initiated collision-avoidance. Also incorporated within this description are analytical proofs to verify that correct collision-avoidance in networks subject to hidden terminals can be obtained using the collision-avoidance methods of the present invention.

It will be appreciated that the transceiver nodes within the network must have the ability to sense carrier. The detection of carrier may be provided within the nodes by any of a number of wireless communication standards, such as within baseband radios, and in slow-frequency hopping radios in which complete packets are sent in the same frequency hop.

The following aspects of the invention describe aspects of the inventive method in terms of the operation of a first node, which is a polling node, and a second node, which is a polled node. One aspect of the invention, by way of example and referred to as RIMA-SP (simple polling), comprises transmitting a data packet over the network by a first node, after a first collision-avoidance delay interval, in response to the receipt of a ready-to-receive control packet (RTR) from a second node indicating said second node is ready to receive a data packet. The transmission of the data packet may then be cancelled during the first collision-avoidance delay interval in response to the receipt of a no-transmission-request (NTR) control packet which indicates the detection of activity within said channel.

Another aspect of the invention, referred to as RIMA-DP (dual-purpose) provides for the dual-use of the ready-to-receive (RTR) control packet, wherein RTR also indicates that the first node (polling node) requests to transmit data to the second node (polled node). If the second node has no data packets for transmission to the polling node after receiving the RTR control packet, it will send a clear-to-send (CTS) control packet to the first node. The first node (polling node) then transmits the data packet to the second node (polled node) subject to checking for channel activity within a second collision avoidance interval.

A further aspect of the invention provides a broadcast polling mode, referred to as RIMA-BP (broadcast polling) wherein the ready-to-receive signals are communicated to a number of neighbors. Collision avoidance between multiple responses is facilitated by having the polled node send a ready-to-send (RTS) control packet to precede the sending of the data packet, wherein a polling node subject to multiple RTS control packets can send a no-transmission-request (NTR) control packet to prevent data packet collisions.

The conclusion from an analysis of the existing protocols, and the RIMA protocols of the present invention indicate that the use of receiver-initiated multiple access with dual-use polling (RIMA-DP) according to an aspect of the present invention provides the highest level of efficiency of the MAC protocols for single-channel networks utilizing asynchronous transmissions.

An object of the invention is to reduce the control overhead within single channel wireless networks.

Another object of the invention is to prevent packet collisions within wireless networks.

Another object of the invention is to provide a method in which both sender-initiated protocols and receiver-initiated protocols may be utilized for reducing the amount of necessary control traffic.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a data flow diagram of a segment from a wireless network containing hidden terminals.

FIG. 2 is a data flow diagram of a segment from a wireless network showing the operation of a receiver-initiated protocol subject to data collisions.

FIG. 5A are data flow diagrams of a RIMA-BP (broadcast-purpose) collision-avoidance method according to an aspect of the present invention, showing the use of a ready-to-send (RTS) control packet to prevent data packet collision when RTR control packets are broadcast to multiple neighboring nodes.

FIG. 5B are data flow diagrams of the RIMA-BP collision-avoidance method of FIG. 5A, showing the use of a no-transmission-request (NTR) control packet to prevent a data packet collision.

DESCRIPTION OF THE INVENTION

Figure 3A:
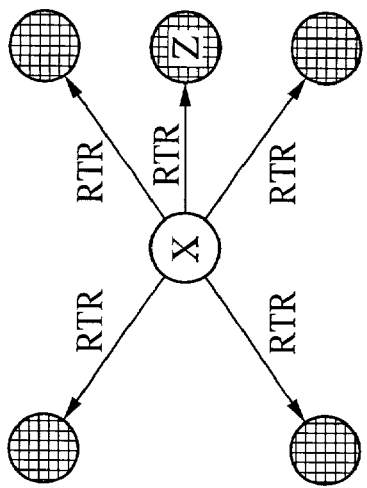
FIG. 3A are data flow diagrams of a RIMA-SP (simple polling) collision-avoidance method according to an aspect of the present invention, showing data transmission from polled node to polling node in response to an RTR control packet.
Figure 3A:
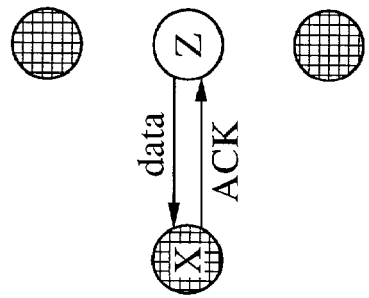
Figure 3A:
Figure 3B:
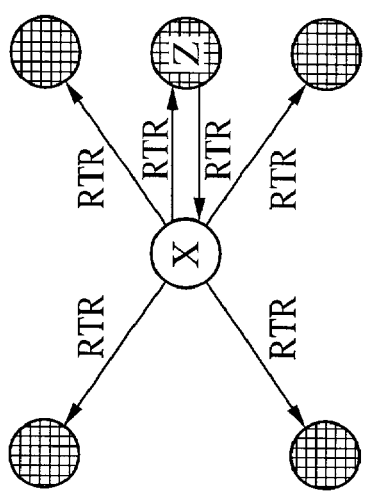
FIG. 3B are data flow diagrams of the RIMA-SP collision-avoidance method of FIG. 3A, showing node backoff in response to receiving RTR control packets destined for other nodes.
Figure 3B:
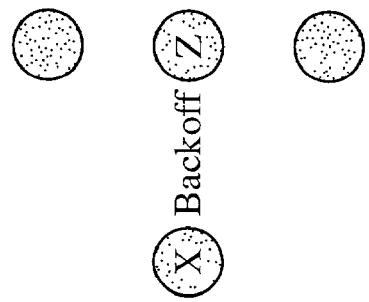
Figure 3B:

The present invention will now be described with reference to FIG. 1 through FIG. 12, which are for illustrative purposes. It will be appreciated that the apparatus may vary as to configuration and as to details of the parts, and that the method may vary as to the specific steps and sequence, without departing from the basic concepts as disclosed herein.

1. Receiver-Initiated Collision-Avoidance

A number of critical design issues exist in receiver-initiated MAC protocols over a single channel, including (a) the choice of whether or not to use carrier sensing, (b) how to persist transmitting packets, (c) how to resolve collisions, and (d) deciding upon the method by which the receiver polls neighboring nodes in the network for data packets.

Carrier sensing is required to avoid collisions of data packets in sender-initiated collision-avoidance over single-channel networks in which transmissions occur in an asynchronous manner, such as without time slotting. It should be appreciated that the use of carrier sensing has also been shown to substantially increase packet throughput on the wireless network. Therefore, the receiver-initiated schemes described herein all presume the use of asynchronous transmissions along with carrier sensing which is considered to be non-persistent, and which simplifies the analysis of the protocols and has been shown to provide better throughput characteristics than persistent disciplines for CSMA and CSMA/CD at high packet loads. Furthermore, the treatment of receiver-initiated collision-avoidance assumes simple back-off strategies. It will be appreciated, however, that the same schemes may be adopted with the use of more sophisticated back-off strategies or collision resolution algorithms, an analysis of benefits that may be derived therefrom is included.

Within sender-initiated collision-avoidance schemes, a node that has data to be communicated polls the network by sending a request-to-send (RTS) packet to other network nodes prior to transmission of the packet. In protocols that use carrier sensing, the RTS packet is sent only if the channel is free. Within receiver-initiated protocols, the decision as to how to send these polling packets is not as immediate as sending transmission requests in sender-initiated protocols. Furthermore, it will be illustrated that the selected polling discipline largely determines the performance of the protocol. A polling rate that is too infrequent, for example, results in low packet throughput and long average delays as each sender with a packet is slowed down by the polling rate of the receiver. By contrast, a polling rate that is too frequent also results in poor performance as the probability of polling packet collisions increases. Three primary factors which characterize the polling discipline within a receiver-initiated MAC protocol:

(1) Whether the polling rate is independent of the data rate at polling nodes.

(2) Whether the poll is sent to a particular neighbor or to all neighbors.

(3) Whether the polling packet asks for transmission permission.

Polling disciplines may be categorized in terms of the relationship between polling rate and data rate as either an independent polling discipline, or a data-driven-polling discipline. When operating with independent polling, a node polls its neighbors at a rate that is independent of the data rate of the node, or the perceived data transmission rate of its neighbors. In contrast, with data-driven polling, a node attempts to poll its neighbors at a rate that is a function of the data rate with which it receives data to be sent, as well as the rate with which the node hears its neighbors send control and data packets. The specification of the conventional MACA-BI protocol assumes this type of data-driven polling. The selection of a workable independent polling rate by the receivers is difficult within an actual network, and therefore the ensuing description assumes the use of data-driven polling.

In practice, a protocol using data-driven polling should perform polling based on the presence of local data to be sent, or after a polling timeout occurs wherein the node lacks a packet to send to any neighbor. The above polling practice accounts for data rate differences at nodes and eliminates the possibility that a node would never be allowed to receive data. The intended audience of a polling packet may comprise a single neighbor, a subset of neighbors, or all neighbors of a given node. The existence of a large audience for a polling packet introduces the opportunity for contention among the plurality of responses generated as a result of the polling packet. The collisions may be prevented by providing neighboring nodes with a schedule upon which to base response polling, or by resolving packet collisions.

A polling packet may be sent to ask a neighboring node if it has data to send to the polling node, or it can request data and simultaneously request permission to transmit data to the given neighbor if that neighbor does not have data to be sent according to the present invention. It will be appreciated that the polling packet which combines a data request with a transmit permission request should provide improved channel utilization, because data is sent after every successful handshake, and more data per successful handshake may then be sent as traffic load increases even if the polled node does not have data for the polling node. It should also be appreciated that a polling packet requesting data from a neighboring node could allow the polled node to send data to any destination, wherein the data may be sent to nodes other than the polling node. It will be appreciated, however, that the preceding "any destination" strategy would not operate efficiently in multi-hop networks, because no assurance exists that the data packet will be received without interference, as the data packet has been sent without the recipient requesting it. Although the three primary factors of a polling discipline can also be defined by using polling response schedules, these more complex receiver-initiated techniques are not described herein, in deference to the simpler mechanisms of single-node polling and broadcast polling.

2. Receiver-Initiated Protocols

Receiver-initiated MAC protocols according to the present invention are described for eliminating data packet collisions with other control packets, or data packets, even in the presence of hidden terminals. The original MACA-BI protocol utilizes a ready-to-receive (RTR) control packet to invite a node to send a data packet, and any given node may only send a data packet after having received an RTR control packet. Nodes which receive RTR control packets destined for other nodes are required to back off long enough to allow a packet to be sent in the clear. According to the description of MACA-BI, a polled node can send a data packet intended to the polling node of any other neighbor. In a fully-connected network, all the nodes must back off after receiving an RTR control packet in the clear, irrespective of whether or not the data packet is being sent to the polling node. However, the situation changes for networks having one or more hidden terminals.

2.1. Protocols with Simple Polling 2.1.1. MACA-BI

MACA-BI protocols do not prevent data packets sent to a given receiver from colliding with other data packets sent concurrently in the neighborhood of the receiver. The drawbacks of the MACA-BI protocol will be illustrated through two examples. The first example is provided to illustrate that in order to avoid the transmission of data packets that the intended receiver cannot hear, because of other colliding data packets, a polled node should send data packets only to the polling node. The second example is provided to illustrate the possibility of data packet collisions at a receiver as a result of the receiver sending an RTR control packet at approximately the same time as the data destined for another receiver arrives.

FIG. 1 depicts an example in which nodes a and d send RTR control packets to nodes b and e at time $t_0$, respectively, the arrival of which prompts the polled nodes to send data packets at time $t_1$. A problem occurs however when at least one of the polled nodes sends a data packet addressed to c, wherein c is unable to hear either packet.

FIG. 2 depicts an example in which node a sends an RTR control packet to b at time $t_0$. This RTR control packet causes node b to start sending data to node a at time $t_1$ which in order to provide adequate throughput must be larger than $\gamma$ seconds, where $\gamma$ is the length of an RTR control packet. At time $t_2$ node c starts sending an RTR control packet to node d. As a result of carrier sensing, $t_2$ must be within $\tau$ seconds (maximum propagation delay) of $t_1$. In this example, after receiving the RTR control packet from node c, node d replies with data that must start arriving at node c at time $t_3$. Since the maximum propagation delay is $\tau$, it must be true that $t_3 \leq t_2+\gamma+2\tau \leq t_1+\gamma+3\tau$. Hence, if data packets last longer than $\gamma+3\tau$ seconds, the data packets from b and d collide at c. In practice, data packets must be much longer than RTR control packets to encourage high throughput and it thereby follows that MACA-BI is unable to assure that data packet collisions are avoided.

2.1.2. RIMA-SP

These shortcomings of the MACA-BI protocol which result in data packet collisions may be eliminated by making the following two modifications.

Restricting the polled node to only transmitting data packets destined for the polled node.

Adding a No-Transmission-Request (NTR) signal, and adding a collision-avoidance waiting period of $\xi$ seconds at polled nodes prior to answering an RTR control packet.

If any channel activity is heard during the collision-avoidance waiting period then the receiver (polling node) that originated an RTR control packet sends an no-transmission-request (NTR) control packet telling the polled node not to send any data. Otherwise, if no activity is detected during the waiting period, the polled sender transmits its available data for the polling node. The above described protocol of the present invention is based on the MACA-BI protocol and is referred to as receiver-initiated multiple access with simple polling (RIMA-SP).

In RIMA-SP, every node initializes itself to a START state in which the node waits for a time period comprising twice the maximum propagation delay, plus the hardware transmit-to-receive transition time ($\epsilon$), before sending anything over the channel. This enables the node to find out if there are any ongoing transmissions. After a node is properly initialized, it transitions to the PASSIVE state. Regardless of node state the node must first listen to the channel for a period of time sufficient for the node to start receiving packets in transit prior to transmitting anything to the channel.

Figure 3C:
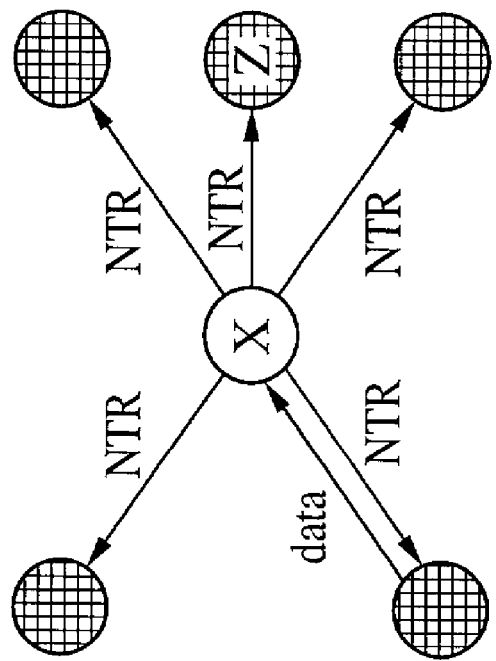
FIG. 3C are data flow diagrams of the RIMA-SP collision-avoidance method of FIG. 3B, showing the transmission of a no-transmission-request (NTR) control packet by the polling node upon detecting channel activity during a collision-avoidance interval after transmission of an RTR control packet.
Figure 3C:
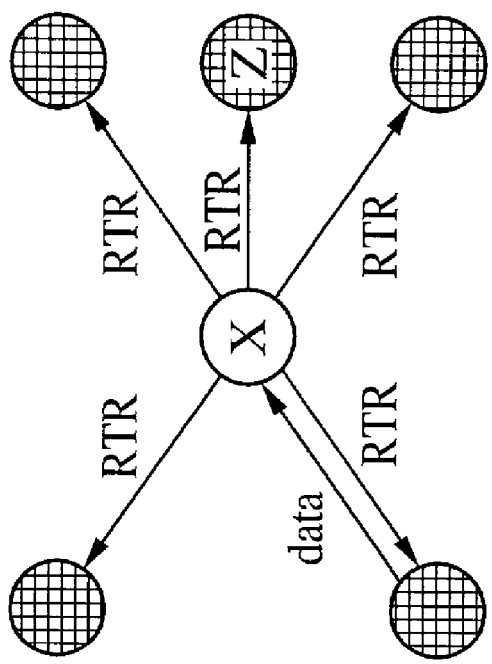

If a node in the PASSIVE state detects noise in the channel then it must transition to the BACKOFF state. If a node x in the PASSIVE state obtains an outgoing packet to send to neighbor z, it transitions to the RTR state. Node x in the RTR state uses non-persistent carrier sensing to transmit an RTR control packet. If node x detects carrier upon attempting to sent the RTR control packet, it transitions to the BACKOFF state, which and the node backs off immediately for a sufficient amount of time to allow a complete handshake between a sender-receiver pair to occur. If carrier is not detected by node x, then node x sends an RTR control packet. If node z correctly receives the RTR control packet and has data for node x it wait for $\xi$ seconds. If no activity is detected within the channel during the waiting period, node z transitions to the XMIT state and transmits a data packet to node x and node x accordingly sends an acknowledgement (ACK) upon data packet receipt, as shown in FIG. 3A. If, however, activity is detected in the channel node z assumes that a collision occurred and transitions to the BACKOFF state to allow floor acquisition by another node, as show in FIG. 3B. Channel activity is sensed by node x after it sends an RTR control packet. If carrier is detected by node x immediately after sending an RTR control packet, then node x assumes that either a successful data transfer to a hidden node is taking place or that a collision occurred. Therefore, node x sends a no-transmission-request (NTR) control packet to z to prevent z from sending data that would collide at node x, as shown in FIG. 3C.

After a period of time elapses node x determines whether or not its RTR control packet was correctly received by node z. The time that must elapse is equal to the maximum round-trip delay to its neighbors plus the time associated with turn-around delays and processing delays at the nodes, plus the waiting period $\xi$. Node x listens to the channel to detect ongoing transmissions after sending its RTR control packet. As a result of the finite (non-zero) propagation delays involved, node x can conclude that any carrier detection immediately following RTR transmission is the result of a node, other than node z, which would take a longer time to respond due to its need to delay its data to node x to account for the turn-around times.

The duration of both RTR control packets and NTR control packets is preferably identical. Arguments with substantial merit have been put forth in the industry that the duration of an RTS control packet must exceed the maximum propagation delay between two neighbors to ensure correct collision-avoidance. A similar argument may be posited that the duration of RTR control packets and NTR control packets must exceed the maximum propagation delay. In ad-hoc networks within ISM bands, the propagation delays are much smaller compared with any packet that needs to be transmitted.

To reduce the probability of ongoing competitions between nodes competing for a given receiver at the time of a subsequent RTR control packet, the RTR control packet preferably includes a back-off time period value to facilitate contention prevention. In response to the specified time period given within the RTR control packet, nodes that enter the BACKOFF state compute a random backoff time as a multiple of the specified back-off-period within the RTR control packet. One simple form of computation consists of computing a random number of back-off-period units using a uniformly distributed random variable from 1 to d, where d is the maximum number of neighbors which exist for a given receiver. A simple back-off-period unit can consist of the time required for sending a small data packet, or other communication time metrics.

2.2. Protocols with Dual-use Polling

Figure 4A:
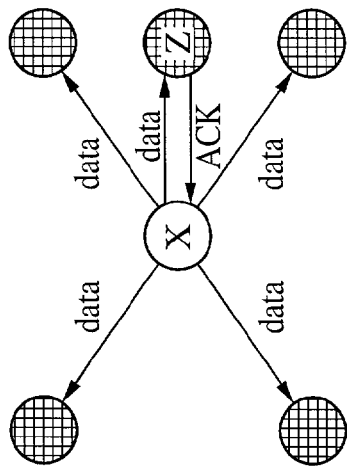
FIG. 4A are data flow diagrams of a RIMA-DP (dual-purpose) collision-avoidance method according to an aspect of the present invention, showing receiver-initiated data packet communication from polled node to polling node.
Figure 4A:
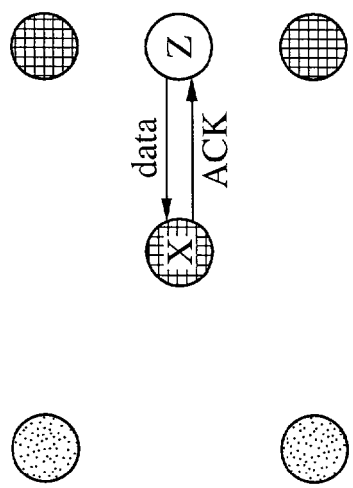
Figure 4B:
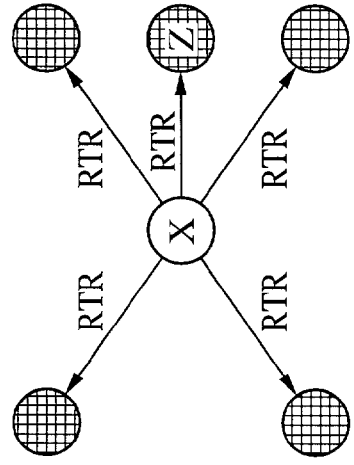
FIG. 4B are data flow diagrams of the RIMA-DP collision-avoidance method of FIG. 4A, showing the use of the no-transmission-request (NTR) control packet to during a collision-avoidance interval subsequent to RTR control packet transmission.
Figure 4B:
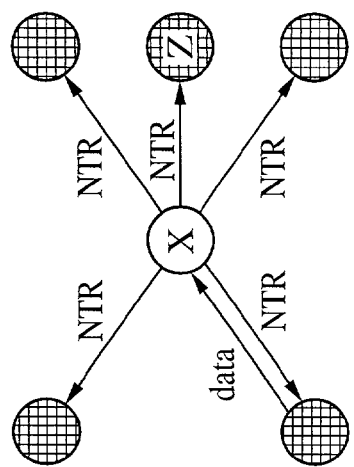
Figure 4B:
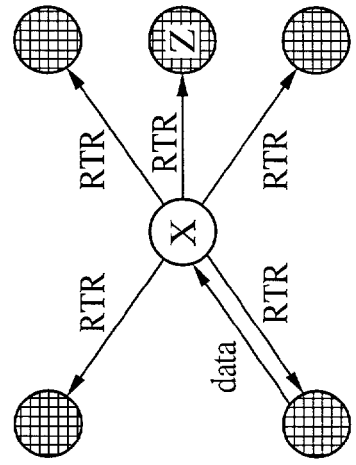
Figure 4C:
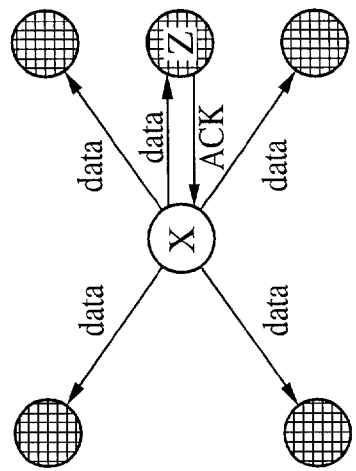
FIG. 4C are data flow diagrams of the RIMA-DP collision-avoidance method of FIG. 4B, showing the use of the RTR control packet to request data packet transmission from the polling node to the polled node which is facilitated by the clear-to-send (CTS) control packet.
Figure 4C:
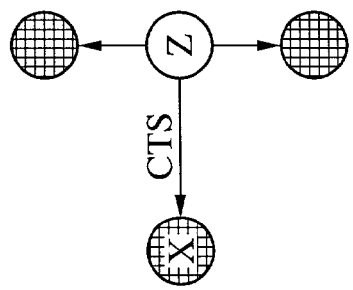
Figure 4C:
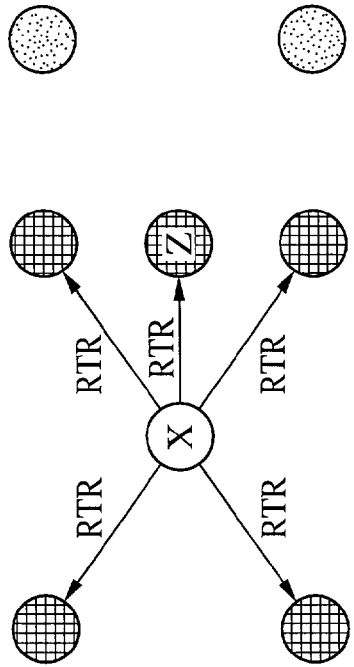
Figure 4D:
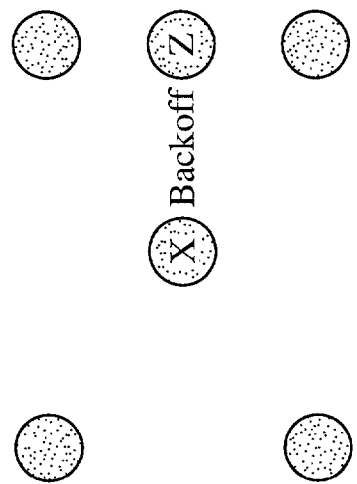
FIG. 4D are data flow diagrams of the RIMA-DP collision-avoidance method of FIG. 4C, showing nodes backing off upon receipt of RTR control packets destined for other nodes.
Figure 4D:
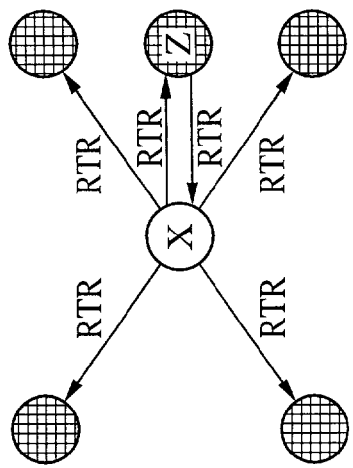

The described collision-avoidance strategy for RIMA-SP can be improved by increasing the probability that data follows a successful RTR transmission, without violating the rule that data packets should be transmitted only if they are addressed to the polling nodes. The RIMA-DP (receiver-initiated multiple access with dual-purpose polling) protocol provides a preferred method of increasing the probability that data will follow an RTR is to utilize the RTR as a dual-purpose request, wherein the RTR control packet requests data from the polled node, and simultaneously requests permission to allow the polling node to send data. FIG. 4A through FIG. 4D illustrate collision-avoidance handshaking according to RIMA-DP which permits the polling node to either receive or send data without collisions. FIG. 4A depicts a key benefit of dual-use polling within RIMA-DP, specifically both polling and polled nodes can send data in a round of collision-avoidance, which is possible because the RTR control packet causes all the neighbors of the polling node to back-off, and the data from the polled node similarly causes all of its neighbors to back off, which can then be used by the polling node to send its data. Polled node data packet transmission is shown in FIG. 4A. The use of a no-transmission-requests (NTR) control packet is depicted in FIG. 4B when the polling node detects channel activity after sending an RTR control packet. It should be appreciated that transmission priority in RIMA-DP is given to the polling nodes. For example, when a node z is polled by node x and has data for node x, node z waits $\xi$ seconds before sending a data packet. In contrast to this, if the polled node does not have data for x, it immediately sends a CTS (clear-to-send) control packet to x as shown in FIG. 4C. This permits a polling node x exposed to a neighbor sending data to hear part of the data packet sent by the neighbor after sending its RTR control packet. In a case such as that, node x can send an NTR control packet to the polled node to cancel its RTR control packet, which prevents collisions of the data packets provided that z waits for $\xi > \gamma + 7\tau$ seconds before sending any data after being polled, and the length of a CTS control packet is $2\tau$ seconds longer than the length of an RTS control packet. RIMA-DP protocol is similar to the RIMA-SP protocol with regard to the preferred equal length of the RTR and RTS control packets. FIG. 4D depicts nodes receiving RTR control packets destined for other nodes, wherein the nodes backoff to prevent possible data packet collision.

As in RIMA-SP, every node starts in the START state and transitions to the PASSIVE state upon initialization. If a node x is in the PASSIVE state and senses carrier, it transitions to the REMOTE state to defer to ongoing transmissions. Prior to attempting to transition from the REMOTE state, a node must allow sufficient time for the successful completion of a handshake. Any node in the PASSIVE state that detects noise in the channel is required to transition to the BACKOFF state where it must similarly allow sufficient time for a successful handshake. Node x transitions from the PASSIVE state to the RTR state upon receipt of an outgoing packet to send to neighbor z. While in the RTR state node x behaves in a manner consistent with RIMA-SP. If node z receives the RTR correctly, and it has data for node x, it pends for $\xi$ seconds prior to sending a data packet to node x. If no activity is detected in the channel during the waiting period, node z transitions to the XMIT state from which it transmits a data packet to x. However, if activity is detected in the channel, then node z assumes that a data transfer to a hidden node is occurring or that a packet collision has occurred, wherein it transitions to a BACKOFF state. Node z immediately sends a CTS to node x if no data is available to be sent to node x. If node x detects carrier immediately after sending an RTR, it will defer its transmission attempt and send an NTR to the node it polled. CTS length, which is preferably $\tau$ seconds longer than an RTR, forces polling nodes that send RTR control packets at about the same time when a polled nodes sends a CTS to detect carrier from the CTS and to cease any attempts to send or receive data. It will be appreciated that any node, other than x, which receives the CTS for x is required to transition to the BACKOFF state. Upon node x receiving the CTS from node z it transitions to the XMIT state and transmits a data packet to z.

2.3. Protocols with Broadcast Polling

Figure 5C:
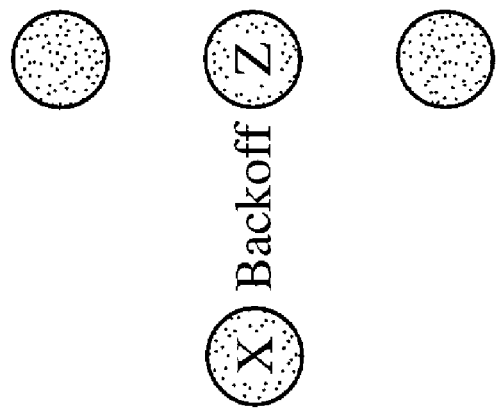
FIG. 5C are data flow diagrams of the RIMA-BP collision-avoidance method of FIG. 5B, showing node backoff in response to receipt of RTR control packets destined for other nodes.
Figure 5C:
Figure 5C:
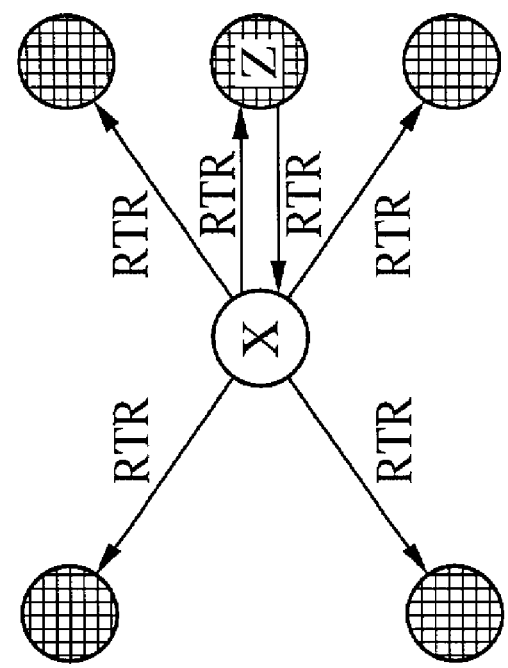

FIG. 5A through FIG. 5C illustrate another preferred approach wherein an RTR control packet may be sent to multiple neighbors in a broadcast polling mode and the protocol is referred to as RIMA-BP (broadcast polling). RIMA-BP may be distinguished from RIMA-SP in that an RTS control packet is sent, as shown in FIG. 5A, prior to the transmission of a data packet. A node, therefore, broadcasts an RTR control packet only when there exists a local data packet (data-driven polling). A node is thereby only allowed to send data after it receives an invitation to do so. It should be appreciated that a poll broadcast which is sent to all the neighbors of a node can trigger multiple neighboring nodes to attempt sending data to the polling node. Therefore, an additional no-transmission-request (NTR) control packet as shown in FIG. 5B is utilized to ensure that transmission collisions do not occur during transmissions of user data, and any collisions are further constrained to short duration events. The additional control packet is preferably implemented by having the polled node send a short RTS (ready-to-send) control packet prior to sending data. Furthermore, after sending an RTS control packet, the polled node is required to wait for $\xi$ seconds to allow the polling node to send an NTR control packet if collisions between RTS control packets occur at the polling node. It can be shown that the use of RIMA-BP correctly avoids collisions in the case of $\xi = 4\tau$. FIG. 5C depicts nodes receiving RTR control packets destined for other nodes, wherein the nodes backoff to prevent possible data packet collision. It will be appreciated the timing of the return from backoff is preferably responsive to a parameter within the RTR control packet which is modulated by a random number, such that nodes do not simultaneously return from the respective backoff states.

3. Correct Collision-Avoidance in RIMA Protocols

Collision-avoidance utilizing the RIMA-SP and RIMA-DP protocols are configured to ensure that no collisions occur between data packets and any other transmissions. A theoretical analysis of the protocols ensues in which the following assumptions have been made:

(A0) A node transmits an RTR control packet that does not collide with any other transmissions with a non-zero probability.

(A1) The maximum end-to-end propagation time is the channel is given by $\tau < \infty$.

(A2) A packet sent over the channel which is not subject to collision with other transmissions is delivered error-free with a non-zero probability.

(A3) All nodes correctly execute the RIMA protocol.

(A4) The transmission time of an RTR and a CTS control packet is $\gamma$, the transmission time for a data packet is given by $\delta$, and the hardware transmit-to-receive transition time is zero; furthermore, $2\tau < \gamma \leq \delta < \infty$.

(A5) There is no capture of fading in the channel.

The analytical approach utilized to verify the operation of the RIMA collision-avoidance protocols consists of illustrating that data packets sent by nodes are correctly received by the intended receiver without interference. Polling nodes and polled nodes exist, as in any receiver-initiated collision-avoidance scheme, and it must be shown that any interference at the polled node prevents the polled node from sending data, while any detected interference at a polling node that has sent an RTR control packet forces the node to jam the polled node to prevent data from arriving and colliding at the polling node.

In view of the necessity of detecting interference at both the polling nodes and polled nodes, the described receiver-initiated collision-avoidance protocols utilize carrier sensing. It will be appreciated that the applicability of carrier detection is substantially limited to baseband radios, slow frequency hopping radios, and so forth, and that periods of fading may disrupt dialogue within any collision-avoidance system, such as may arise from data packet collisions which arise in the presence of fading. The analysis of the protocols is simplified by assuming that both the processing overhead and the turn-around delays are negligible.

Theorem 1: RIMA-SP provides correct collision-avoidance in the presence of hidden terminals, under the condition that $\xi=\tau$.

Proof: Consider a polling node A and a polled node X, and assume that A sends an RTR at time $t_0$. If X does not receive the RTR correctly due to interference from any neighbor hidden from A, it does not send any data. Else, X waits $\xi=\tau$ seconds after receiving the RTR from A before sending its data to A. Since propagation delays are positive, the earliest time when X can start sending data to A is $t_1>t_0\gamma+\tau$. On the other hand, if A detects interference immediately after sending its RTR, for instance at time $t_0+\gamma$, it commences to send an NTR to X, and this NTR must start arriving at X no later than $t_2\leq t_0+\gamma+\tau$. Because $t_1>t_2$, it follows that X cannot send data to A that can collide with any other transmission arriving at A.

Theorem 2: RIMA-DP provides correct collision-avoidance in the presence of hidden terminals, providing that $\xi>\gamma+7\tau$ and a CTS lasts $2\tau$ seconds longer than an RTR. Proof: Consider a polling node A, a polled node X, and assume that A sends an RTR to X at time $t_0$. If A is exposed to a polled node Y sending data or a CTS, A must have started its RTR within $\tau$ seconds of the Y node commencing transmission, otherwise A would have detected carrier caused by Y and would not have sent an RTR. Accordingly, since data packets and CTS packets are at least $\gamma+2\tau$ in length, A is required to detect carrier associated with the transmission from Y immediately after sending an RTR, which forces node A to send an NTR $t_0+\gamma$. Therefore, regardless of what happens at the polled node X, the polling node A must send an NTR immediately following its RTR and back-off, wherein it is incapable of sending any data if any exposed polled node is either sending or requesting data.

Assume that A is not exposed to a polled node sending or requesting data, but is exposed to a polling node B. Let A pole node X and B pole node Y. For both A and B to send their RTR control packets they must do so within $\tau$ seconds of each other, for otherwise one the two would detect carrier and back-off. For X to send any packet to A (data or CTS), the RTR from A must be received collision-free at X. Whereas X can successfully receive the RTR control packet from A no earlier than $t_1>t_0+\gamma$, as all propagation delays are positive. If x has no data for A, it sends a CTS immediately to X. This CTS can arrive in its entirety at A no earlier than $t_2>t_0+2\gamma+2\tau$, because a CTS lasts $\gamma+2\tau$ seconds and propagation delays are constrained to positive values. The same situation holds true for the node Y polled by B. Therefore, if both X and Y send data, Y must be hidden from A, and X must be hidden from B, and no data packets collide.

Protocol variations are now considered. In a first case one polled node sends a CTS and the other sends data, in a second case both polled nodes send data, and in a third case each polled node sends a CTS.

Without loss of generality, assume that Y sends a CTS and X is ready to send data. The earliest time when X can start sending data is $t_2>t_0+2\gamma+\xi$ because propagation delays are necessarily positive. However, the latest time at which A must begin to receive data sent by B, after B receives the CTS from Y, is $t_3\leq(t_0+\tau)+(2\gamma+3\tau)+\tau$. The first $t_0+\tau$ term stems from the fact that node B can send its RTR up to $\tau$ seconds after A commences sending its RTR. The second term $(2\gamma+3\tau)$ corresponds to the RTR from B, and the CTS from Y, plus the corresponding maximum propagation delays, and the last term $\tau$ is the maximum propagation delay of data from B to A. Accordingly, A must detect carrier and commence sending an NTR at time $t_3$, and X must detect carrier from the NTR of A at a time given by $t_4\leq t_3+\tau\leq t_0+2\gamma+7\tau$. Because $t_2>t_0+\gamma+\xi$ and $\xi>\gamma+7\tau$, it follows that X cannot send its data to A, and thereby no collisions may occur.

If both X and Y send data or a CTS after being polled, no collision occurs within the data packets because, as it has been shown, that X must be hidden from B and Y must be hidden from A. Therefore, RIMA-DP correctly provides collision-avoidance.

4. Performance Analysis of RIMA Protocols

The anticipated performance for the various polling policies described for the RIMA protocols according to the present invention are analyzed and compared with current collision-avoidance protocols, namely MACA and FAMA-NCS. The choice of protocols was made because MACA is the simplest sender-initiated collision-avoidance protocol and FAMA-NCS has the best reported performance of existing MAC protocols based on sender-initiated collision-avoidance.

4.1. Approximate Throughput

Throughput for the receiver-initiated protocols is approximated using the model first introduced by Kleinrock and Tobagi for CSMA protocols and subsequently utilized for analyzing MACA, FAMA, MACA-BI, and several other collision-avoidance protocols. The following list of assumptions are made according to this model.

1. N nodes exist in the fully-connected network
2. Single unslotted channel is used for all packets and it introduces no errors
3. All nodes can detect collisions perfectly.
4. Data packet size given by duration of $\delta$ seconds and the size of control packets RTR, ACK, and RTS are approximately $\gamma$ and the size of a CTS for FAMA-NCS is $\gamma+2\tau$.
5. Turn-around time $\epsilon$ is considered to be part of the control packet duration.
6. Channel propagation delay between any two nodes is $\tau$ seconds.

The prior analysis of receiver-initiated MAC protocols did not take into account the effect of ACK control packets for the sake of simplicity, however, the present analysis includes the overhead incurred by ACK control packets which are necessary for information the sender of the correct reception of a data packet.

To provide a non-biased comparison between sender-initiated and receiver-initiated protocols while preserving the tractability of the analytical model, it is assumed that a polled node receiving an RTR control packet always has a data packet to send, however, the probability that the data packet is addressed to the polling node is $1/N$. Furthermore, it is assumed that each node sends its RTR according to a Poisson distribution with a mean rate of $$\frac{\lambda}{N},$$

and that, when applicable, the polling node chooses the recipient of the RTR control packet with equal probability. This model is slightly biased against RIMA protocols in relation to MACA-BI since the likelihood that a polled node can transmit is considered to remain constant despite an increasing traffic load. To account for this disparity, heavy traffic approximations are described wherein a polled node always has data to send to any polling node.

The corresponding assumptions for sender-initiated protocols are that a node always has packets to send, but schedules the transmission of RTS control packets according to a Poisson distribution with a mean rate of $$\frac{\lambda}{N},$$

and selects the polling node as the neighbor to which the RTS control packet is sent with probability $$\frac{1}{N}.$$

These assumptions preserve the validity of prior analytical results for FAMA and MACA. As a result RTS control packets and RTR control packets arriving at a rate which follows a Poisson distribution, the average channel utilization if given by:

$$S = \frac{\overline{U}}{\overline{B} + \overline{I}} \quad (1)$$

where $\overline{B}$ is the expected duration of a busy period defined to be a period of time during which the channel is being utilized, $\overline{I}$ is the expected duration of an idle period defined as the time interval between two consecutive busy periods, and $\overline{U}$ is the time during a busy period that the channel is used for transmitting user data successfully.

4.1.1. MACA-BI Analysis

The throughput of the MACA-BI protocol in a fully-connected network is described in the following. In a network with hidden terminals, the performance of MACA-BI degrades substantially according to two factors (a) the probability of bad busy periods which increase in response to the probabilities that either a node sends an RTR control packet within τ seconds of any neighbor sending a data packet, or a node receives a data packet addressed to it while it also receives other data packets; and (b) the length of a bad busy period is proportional to the length of a data packet, rather than the length of an RTR control packet as in RIMA-SP.

Theorem 3: The throughput for a MACA-BI protocol in a fully-connected network is given by:

$$S = \frac{\delta}{\delta + \gamma + 2\tau + \frac{1}{\lambda} + (\gamma + 2\tau)e^{\lambda\tau}} \quad (2)$$

Proof: Because a successfully polled node can send data to any neighbor, the probability that a successful transmission occurs equals the probability that an RTR is transmitted successfully, that is:

$$P_S = e^{-\lambda\tau} \quad (3)$$

The duration of every successful busy period is $2\gamma + \delta + 3\tau$, and the first and the last packet of the busy period is the successful packet of the period. Because the network is fully connected, a failed busy period can occur only when there is a collision between RTR control signals, the probability of which is given by $1 - P_S$. The average duration of any busy period always consists of at least the duration of an RTR control packet along with the associated propagation delay, $\gamma + \tau$, plus the average time between the first and last RTR of the busy period, which is denoted by $\overline{Y}$ and is the same as in CSMA, for example:

$$\overline{Y} = \tau - \frac{1 - e^{-\lambda\tau}}{\lambda}$$

If the busy period is successful, a data packet is also sent, therefore, the length of the average busy period in MACA-BI is given by:

$$\overline{B} = \lambda + 2\tau - \frac{1 - e^{-\lambda\tau}}{\lambda} + e^{-\lambda\tau}(\delta + \gamma + 2\tau) \quad (4)$$

$$= \lambda + 2\tau - \frac{1}{\lambda} + e^{-\lambda\tau}\left[\tau + \frac{1}{\lambda} + \delta\right]$$

The length of the average idle period is $1/\lambda$, and the length of the average utilization period is given by:

$$\overline{U} = \delta P_s = \delta e^{-\lambda\tau} \quad (5)$$

The theorem follows by substituting the values of $\overline{U}$, $\overline{B}$, $\overline{I}$ in Eq. 1. Throughput for MACA-BI has been previously reported, however, the prior throughput derivations did not take into account that, in computing the length of an average busy period, the first and last RTR control packets of a busy period are the same and that there exists a non-zero probability that a polled node has no packets to send to any node if RTR control packets are sent when packets arrive following a Poisson distribution. The results of Theorem 2 are substantially the same for the assumed model of the analysis in which a polled node always has something to send, even if it is not the polled node.

4.1.2. RIMA-SP Analysis

The throughput of the RIMA-SP in a fully-connected network is estimated in the following analysis. It should be appreciated that within a network having hidden terminals the performance of RIMA-SP degrades as a result of the increasing vulnerability of the RTR control packets from one propagation delay to essentially twice the duration of the RTR control packet, and by the need to poll nodes to send NTR control packets after the detection of interference.

Theorem 4: The throughput for RIMA-SP in a fully-connected network is given by:

$$S = \frac{\delta \frac{1}{N}}{\frac{\delta + \lambda + \tau}{N} + \xi + \tau + \frac{1}{\lambda} + (\gamma + 2\tau)e^{\lambda\tau}} \quad (6)$$

where $\xi=\tau$.

Proof: Because of the independence assumptions, the probability that a successful transmission occurs equals the probability that an RTR control packet is transmitted successfully, times the probability that the polled node has a data packet for the polling node at the head of its queue, as given by:

$$P_S = e^{-\lambda\tau}\left(\frac{1}{N}\right) \quad (7)$$

The duration of every successful busy period is $2\gamma+\delta+\xi+3\tau$. Notice that in the current case, the first and last packet of the busy period is the successful packet of the period. In RIMA-SP, a failed busy period can occur when a collision occurs between RTR control packets, or when an RTR control packet is sent in the clear but the polled sender does not have a data packet to send to the polling node. The first case occurs with the probability:

$$P_{F1}=1-e^{-\lambda\tau} \quad (8)$$

The probability of the second case of a failed busy-period scenario occurring is given by:

$$P_{F2} = e^{-\lambda\tau}\left(1-\frac{1}{N}\right) \quad (9)$$

As was the case with MACA-BI, every busy period consists of at least one RTR control packet and an associated propagation delay, such as $\gamma+\tau$, plus the average time between the first and the last RTR control packet of the busy period denoted by $\overline{Y}$. When the busy period fails due to the collision of one or more RTR control packets, there are no additional time components remaining within the busy period. When the busy period is successful, Y=0, and additional time is incurred due to the collision-avoidance waiting time and a data packet is incurred, such as $\delta+\xi$. Finally, if the busy period fails as a result of the polled node not having a data packet for the polling node, then an additional propagation delay along with a collision-avoidance waiting time are incurred. Accordingly, the length of the average busy period is given by:

$$\overline{B} = \lambda + 2\tau - \frac{1-e^{-\lambda\tau}}{\lambda} + \frac{1}{N}e^{-\lambda\tau}(\delta+\gamma+\xi+2\tau) + e^{-\lambda\tau}\left(1-\frac{1}{N}\right)(\xi+\tau) \quad (10)$$

$$= \lambda + 2\tau - \frac{1}{\lambda} + e^{-\lambda\tau}\left[\xi+\tau+\frac{1}{\lambda}+\frac{\delta+\gamma+\tau}{N}\right]$$

The length of the average idle period is given by $1/\lambda$, and the length of the average utilization period is given by:

$$\overline{U} = \delta P_S = \delta e^{-\lambda\tau}\left(\frac{1}{N}\right) \quad (11)$$

The theorem follows by substituting the values of $\overline{U}$, $\overline{B}$, and $\overline{I}$ in Eq. 1.

4.1.3. RIMA-DP Analysis

The throughput of the RIMA-DP method within a fully-connected network is estimated in the following analysis. It should be appreciated that performance would degrade within a network having hidden terminals due to the increased vulnerability period of the RTR control packets, which equates to one propagation delay in a fully-connected network and is twice the duration of an RTR control packet in a network with hidden terminals.

Theorem 5: The throughput of RIMA-DP for a fully-connected network is given by:

$$S = \frac{\delta\left(1+\frac{1}{N}\right)}{2\gamma+\delta+3\tau+\frac{1}{\lambda}+\frac{1}{N}(\delta+\xi)+(\gamma+2\tau)e^{\lambda\tau}} \quad (12)$$

where $\xi>\gamma+7\tau$.

Proof: Because the network is fully connected, whenever an RTR control packet is transmitted successfully a packet always follows, either from the node sending the poll or the polled node. Therefore, the probability of success, $P_S$, is equal to the probability with which an RTR control packet is transmitted successfully. Because all nodes are connected, an RTR control packet from node w is successful if there are no other RTR control packets transmitted within $\tau$ seconds from the start of the RTR control packet. After this vulnerability period of $\tau$ seconds, all the nodes detect the carrier signal and act appropriately. Accordingly, $$P_S = e^{-\lambda\tau} \quad (13)$$

The probability, $P_{S1}$, with which the polled node has data to send to the polling node is equal to the probability that an RTR control packet is sent in the clear, times the probability that the polled node has a packet to send to the polling node, that is:

$$P_{S1} = e^{-\lambda\tau}\left(\frac{1}{N}\right) \quad (14)$$

The second case of a successful busy period occurs when the polled sender does not have a packet to send and therefore it sends a CTS control packet back to the sender of the RTR control packet enabling that node to send a data packet. The probability, $P_{S2}$, with which this scenario occurs is equal to the probability that an RTR control packet is sent in the clear, times the probability that the polled node has no data packet for the polling node, as expressed by:

$$P_{S2} = e^{-\lambda\tau}\left(1-\frac{1}{N}\right) \quad (15)$$

Similar to RIMA-SP, the length of an average busy period always includes an RTR control packet and a propagation delay, plus the average time between the first and the last RTR control packet of the busy period. When the busy period fails, there are no additional components in it. With probability, $P_{S1}$, a successful busy period case contains two data packets, one from the polled node followed by one from the polling node, two ACK control packets, plus the associated propagation delays and the collision-avoidance waiting period of $\xi$ seconds. A probability exists, $P_{S2}$, that a successful busy period contains a single data packet from the polling node, an ACK control packet, plus a CTS control packet from the polled node and the associated propagation delays. It follows that the duration of the average busy period is given by:

$$\overline{B} = \lambda + 2\tau - \frac{1-e^{-\lambda\tau}}{\lambda} + \quad (16)$$

$$e^{-\lambda\tau}\left[\frac{1}{N}(2\delta + \xi + 2\gamma + 3\tau) + \left(1 - \frac{1}{N}\right)(2\gamma + \delta + 3\tau)\right] =$$

$$\lambda + 2\tau - \frac{1-e^{-\lambda\tau}}{\lambda} + e^{-\lambda\tau}\left[\frac{1}{N}(\delta + \xi) + 2\gamma + \delta + 3\tau\right]$$

This is the result of the inter-arrival times for RTR control packets which are exponentially distributed, it follows therefore that $\overline{I}=1/\lambda$. The average time at node w is the proportion of time in which useful data are sent, consequently;

$$\overline{U} = P_{S1}(2\delta) + P_{S2}(\delta) = e^{-\lambda\tau}\frac{2\delta}{N} + e^{-\lambda\tau}\left(1 - \frac{1}{N}\right)\delta = e^{-\lambda\tau}\delta\left(1 + \frac{1}{N}\right) \quad (17)$$

Arrival at Eq. 12 results from substituting values of $\overline{U}$, $\overline{B}$, and $\overline{I}$ into Eq. 1.

4.1.4. RIMA-BP Analysis

A similar analysis is provided of the throughput for the RIMA-BP method.

Theorem 6: The throughput of RIMA-BP is given by:

$$S = \frac{\delta}{\delta - \xi + \tau + \left(\frac{N}{N-1}\right)^{N-1}\left[\frac{1}{\lambda} + \gamma + \xi + 2\tau + e^{\lambda\tau}(\gamma + 2\tau)\right]} \quad (18)$$

where $\epsilon > \gamma + 7\tau$.

Proof: Given the independence assumptions, the probability of success, $P_S$, equals the probability with which an RTR control signal is transmitted successfully, times the probability with which an RTS control signal is transmitted successfully. Since all nodes are connected, an RTR control signal from node w is successful if there are no other RTR control signals transmitted within $\tau$ seconds, wherein all the node detect the carrier signal and act appropriately. As a result of the Poisson distribution of the arriving RTR control packets to the channel with a rate $\lambda$, the relationship may be expressed:

$$P_{SRTR} = e^{-\lambda\tau} \quad (19)$$

The probability that only one of the nodes that receive a successful RTR control signal transmits an RTS control signal is equal to the probability that only one neighbor has a packet ready for eh polling node. Because at each neighbor this is the case with probability 1/N, and because each node has N−1 neighbors, this can be expressed as follows:

$$P_{SRTS} = (N-1)\left(\frac{1}{N}\right)\left(1 - \frac{1}{N}\right)^{N-2} \quad (20)$$

Therefore, the probability with which a packet is transmitted successfully is given by:

$$P_S = P_{SRTR}P_{SRTS} = e^{-\lambda\tau}(N-1)\left(\frac{1}{N}\right)\left(1 - \frac{1}{N}\right)^{N-2} \quad (21)$$

There are three ways in which a busy period can be unsuccessful, for instance it may contain no data packet. First, the RTR control packets sent in the busy period may collide with one another, which occurs with probability $1-e^{-\lambda\tau}$ because all nodes can hear one another. A busy period can also fail if a single RTR control packet is sent in the clear but none of the polled nodes has a packet to send to the polling node. The probability of this scenario is given by:

$$P_{F2} = e^{-\lambda\tau}\left(1 - \frac{1}{N}\right)^{N-1} \quad (22)$$

The last case of a failed busy period is when an RTR control signal is successful, but more than one RTS control signal has been sent in response. In this case, the polling node sends an NTR control packet immediately upon detecting the collision. The probability with which this type of busy period occurs is:

$$P_{F3} = e^{-\lambda\tau}\left[1 - 2\left(1 - \frac{1}{N}\right)^{N-1}\right] \quad (23)$$

The average length of a busy period always includes the length of an RTR control packet, a propagation delay, and the average time between the first and the last RTR control packet in the busy period, which is the same as in the previous proofs within this section. When the RTR control packets collide, the busy period has no additional components.

The probability $P_S$ exists that the busy period will also include an RTS control packet from the polled node, a collision-avoidance waiting time at the polling node, the data packet from the polled node, the ACK control packet from the polling node, plus the associated propagation delays. The probability $P_{F2}$ exists that the busy period will contain a waiting time of $2\tau$ after which the polling node detects no RTS control packets. Finally, the probability $P_{F3}$ exists that the busy period will also contain the length of the RTS control packets that collide, and its propagation delay, a collision-avoidance waiting time at the polled nodes, and a propagation delay with which the polling node starts sensing the collision. Accordingly, the duration of an average busy period is given by:

$$\overline{B} = \lambda + 2\tau - \frac{1-e^{-\lambda\tau}}{\lambda} + e^{-\lambda\tau}\left(1 - \frac{1}{N}\right)^{N-1}(2\tau) + \quad (24)$$

-continued $$e^{-\lambda\tau}\left(1-\frac{1}{N}\right)^{N-1}(2\gamma+\delta+\xi+3\tau)+$$

$$e^{-\lambda\tau}\left(1-2\left(1-\frac{1}{N}\right)^{N-1}\right)(\gamma+\xi+2\tau)$$

According to the RIMA-SP specification, the channel will be idle after every data transmission for a period of $\tau+\epsilon$ seconds. In addition, the channel is idle for a time period equal to the inter-arrival rate of RTR control packets, so that $\bar{I}=1/\lambda$. The average utilization time at node w is the proportion of time in which useful data are sent, and it follows that:

$$\bar{U}=\delta P_s=\delta e^{-\lambda\tau}(N-1)\left(\frac{1}{N}\right)\left(1-\frac{1}{N}\right)^{N-2} \quad (25)$$

$$=\delta e^{-\lambda\tau}\left(1-\frac{1}{N}\right)^{N-1}$$

substituting the equations for $\bar{U}$, $\bar{B}$, and $\bar{I}$ into Eq. 1 yields Eq. 18.

4.1.5. Numerical Results

Variable are introduced in Table 1 for comparing the various RIMA protocols with MACA, FAMA-NCS, and MACA-BI protocols. Performance was estimated based on the assumption of a fully-connected network topology with a propagation delay of one microsecond (1 µS), a five hundred byte data packets (500 bytes), control packets RTR, CTS, ACK, and NTR having twenty bytes each (20 bytes) for the various RIMA protocols, a CTS control packet of length $\gamma+\tau$ for FAMA-NCS, a channel rate of one-megabit-per-second (1 Mb/S), and preambles and processing overhead delays which are assumed to be of zero length for simplicity.

Figure 6:
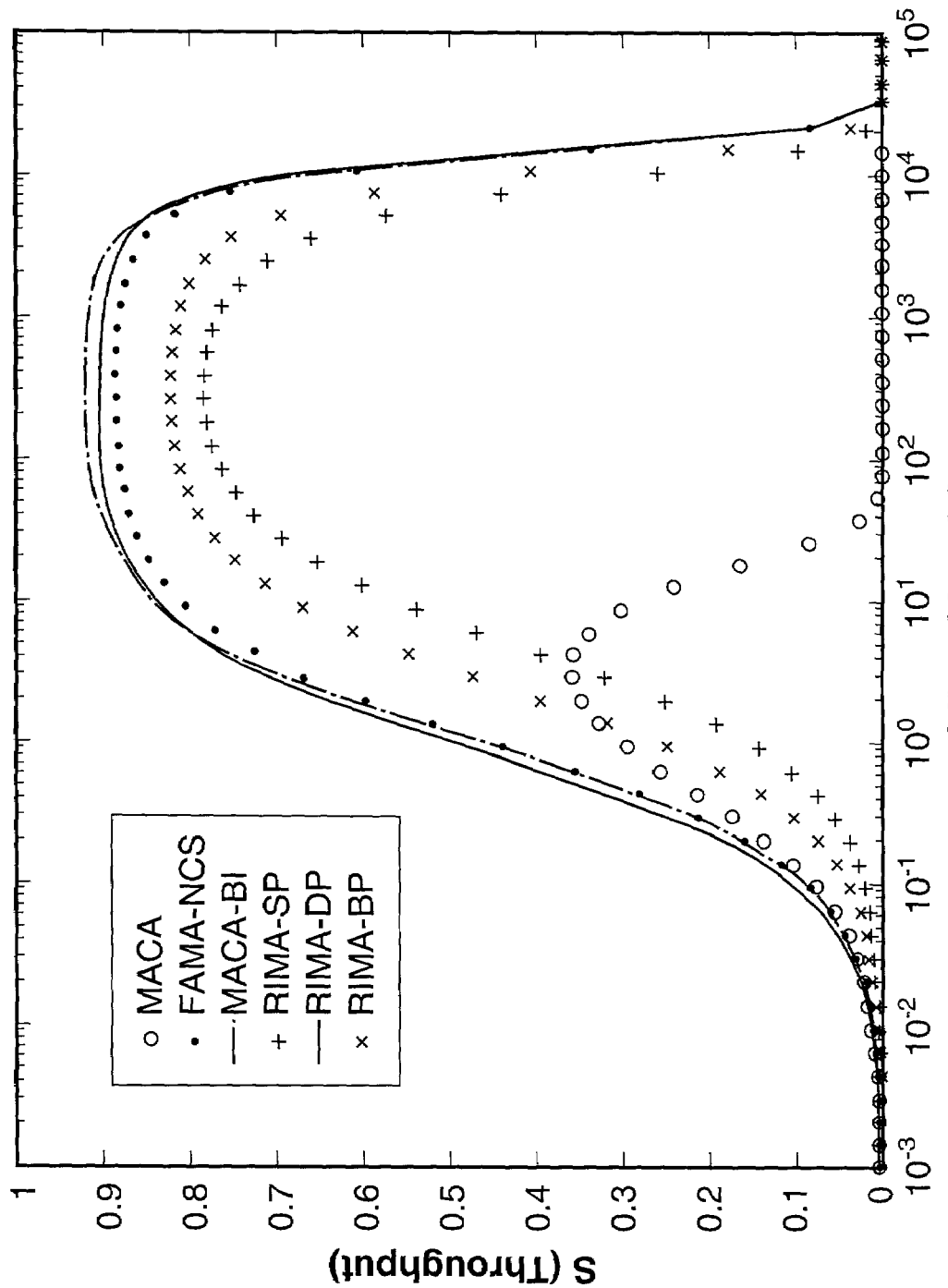
FIG. 6 is a graph of throughput performance versus load for a number of network protocols, wherein the network consists of five nodes.
Figure 7:
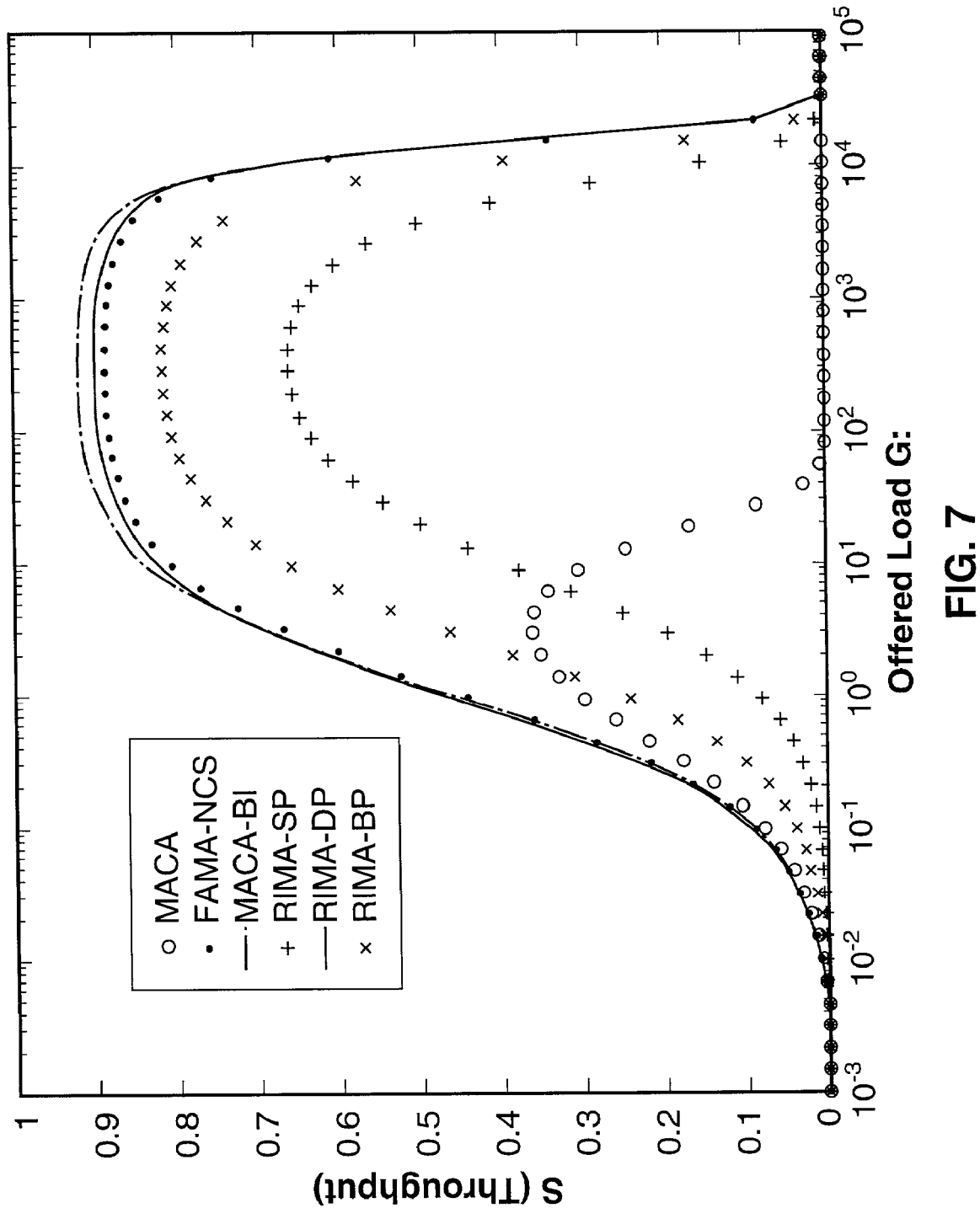
FIG. 7 is a graph of throughput performance versus load for a number of network protocols, wherein the network consists of ten nodes.
Figure 8:
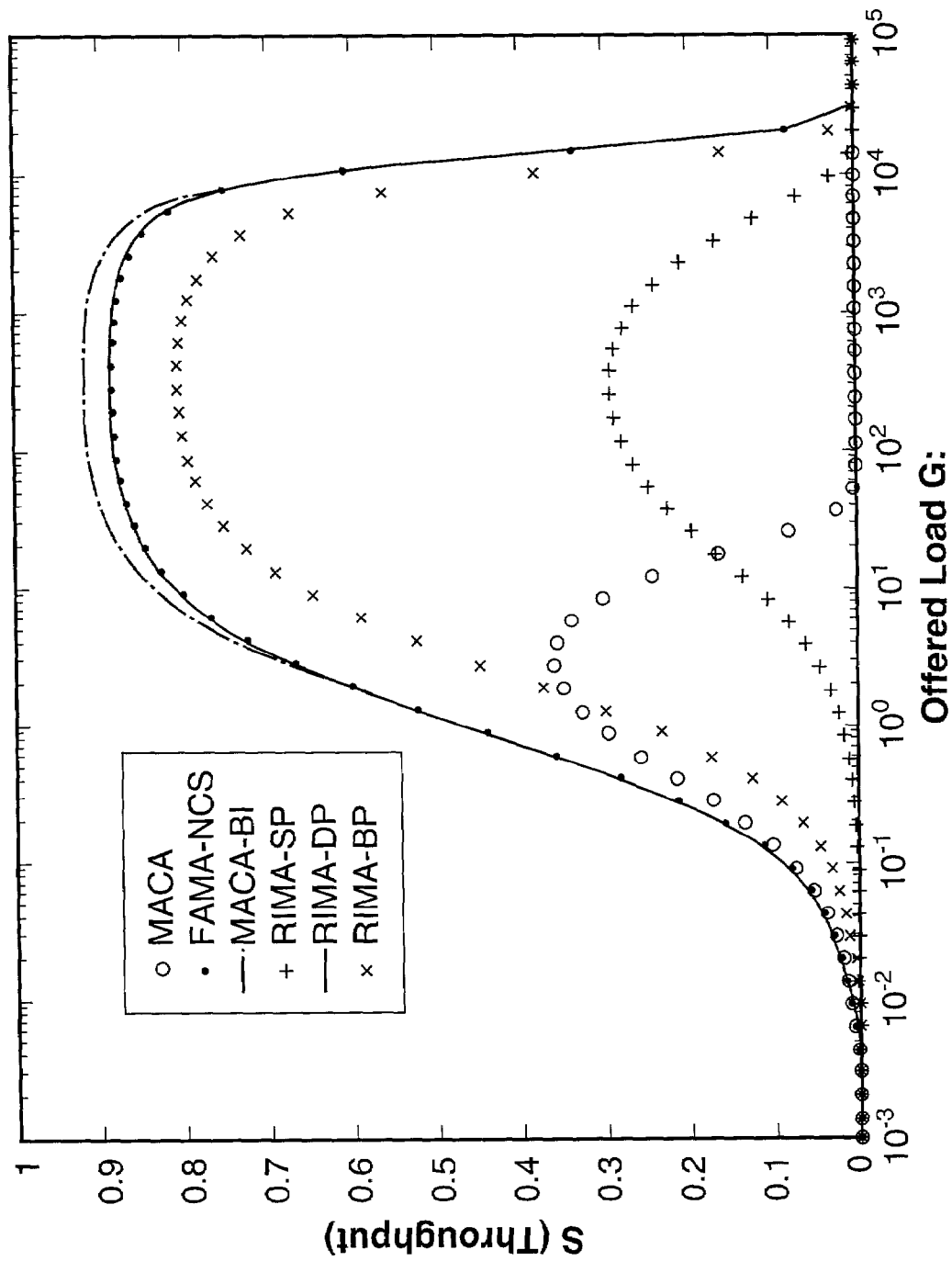
FIG. 8 is a graph of throughput performance versus load for a number of network protocols, wherein the network consists of fifty nodes.

FIG. 6 through FIG. 8 depict throughput versus offered load attained for MACA, FAMA-NCS, MACA-BI, RIMA-SP, RIMA-DP, and RIMA-BP. The offered load is the average offered load when the network consists of five nodes in FIG. 6, ten nodes in FIG. 7, or fifty nodes in FIG. 8. The performance attained by RIMA-DP far exceeds that attained by other MAC protocols that provide collision avoidance (FAMA-NCS, RIMA-SP, and RIMA-BP). This should be expected in view of the ability of RIMA-DP to send one or two packets with each successful handshake, while only one packet per handshake may be sent with the other protocols. The graphs illustrate that the performance of RIMA-SP degrades rapidly as the size of a node neighborhood increases, despite the fact that the model only roughly approximates the impact resulting from neighborhood size, and illustrates that fact that simple polling is inherently limited compared to dual-use polling, because at light and moderate loads, a non-zero probability exists that the polled node has no data to send to the polling node.

It will be appreciated from the graphs that the throughput of RIMA-BP is independent of the number of nodes that exist in the neighborhood, yet is always lower than that provided by RIMA-DP. Two primary reasons appear to exist for this behavior, (1) a node receiving a broadcast poll can only transmit packets to the polling node, and (2) multiple responses (RTS control packets) to the poll are likely to be sent which incur wasted busy periods.

The throughput graphs of FIG. 6 through FIG. 8 also illustrate that carrier sensing is necessary for providing high throughput in addition to correctly avoid collisions. The poor performance of the MACA protocol is due to the long busy period durations within which collisions occur that are bounded by a maximum round trip delay and a control packet length with carrier sensing. It should be appreciated, however, for MACA and variants of collision-avoidance protocols that do not use carrier sensing, that the available COTS radios provide carrier sensing only with FHSS radios operated in ISM bands wherein the entire packets are sent in a single frequency hop. In contrast, collision-avoidance without carrier sensing can be applied to FHSS and DSSS radios. However, in view of the performance advantages available when utilizing carrier sensing, it would appear that FHSS radios are a more attractive alternative than DSSS radios for use in ad-hoc networks. The throughput graphs illustrate that MACA-BI achieves the highest throughput among all the protocols considered, because a polled node can transmit a data packet to any node, not just the polling node. It should be appreciated, however, as discussed previously that a polled node should transmit only if it has data meant for the polling node in order to avoid sending data to a neighbor that is incapable of receiving the transmission in the clear. Nevertheless, the high performance of MACA-BI which has been previously reported by researchers indicates that a receiver-initiated collision-avoidance protocol should perform very well when nodes have traffic to send to the majority of their neighbors.

Figure 9:
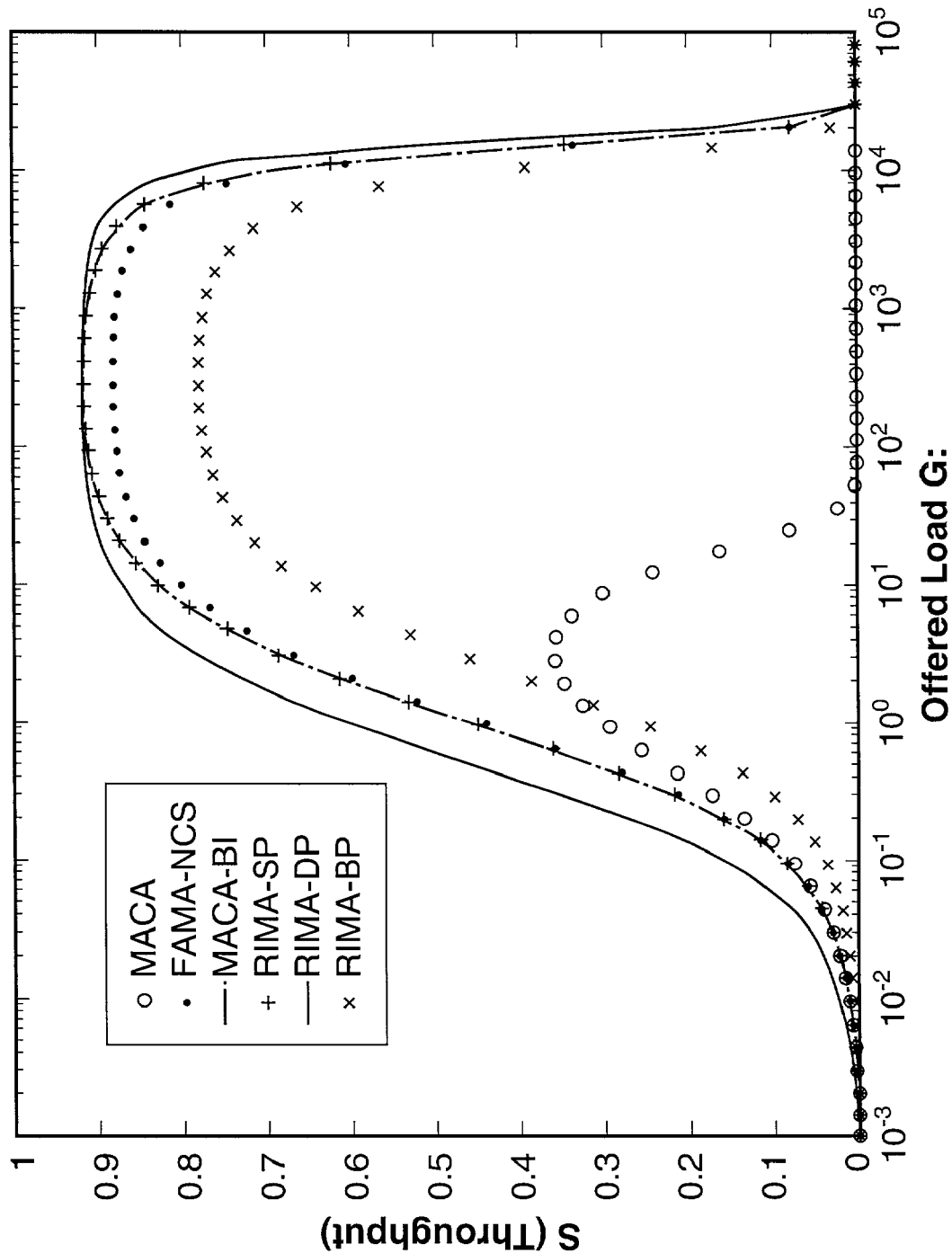
FIG. 9 is a graph of throughput performance under simulated heavy load conditions for a number of network protocols.

FIG. 9 illustrates another throughput comparison that perhaps provides a more equivalent comparison between MACA-BI and RIMA protocols. The comparison is achieved without moving toward a more complex model involving hidden terminals, by approximating heavy-traffic conditions which assume that a polled node always has data to send to any polling node. This approximation is actually close to actual operating conditions in large networks in which a node always has packets in its transmission queue meant for different destinations and has to distribute those packets among its various neighbors. Using this approximation, the probability that a successful RTR packet generates two data packets in RIMA-DP is unity, while the probability that an RTR control packet will not be answered in RIMA-SP is zero, with FIG. 9 illustrating the corresponding results. Under the assumptions of heavy-traffic, RIMA-DP achieves the highest throughput under any given average load, and RIMA-SP exhibits a throughput equivalent to MACA-BI. Both RIMA-DP and RIMA-SP achieve higher throughput than FAMA-NCS in this case as well.

A number of items of interest may be gleaned from the performance results. A strategy which provides collision-avoidance as a joint-effort by both receiver and sender, such as in RIMA-DP, is able to obtain a higher performance than that achieved with FAMA-NCS. The higher throughput would be expected from dual-use polling as it doubles the opportunity for collision-free data to be sent. Protocols based on simple polling (RIMA-SP) yield higher performance than MACA with small numbers of neighbors, however, their performance degrades with increasing numbers of neighboring nodes. RIMA-SP exhibits lower performance than FAMA and RIMA-DP, because polled nodes can send data packets only to polling nodes to avoid collisions, therefore, at low and moderate levels of loading a non-zero probability exists that a polled node has nothing to send to the polling node. It is interesting to note that the undirected polling (RIMA-BP) always provides lower performance than dual-purpose polling. However, the use of undirected polling is still more attractive than simple polling when the node neighborhood increases in size.

4.2. Average Delay

Figure 10:
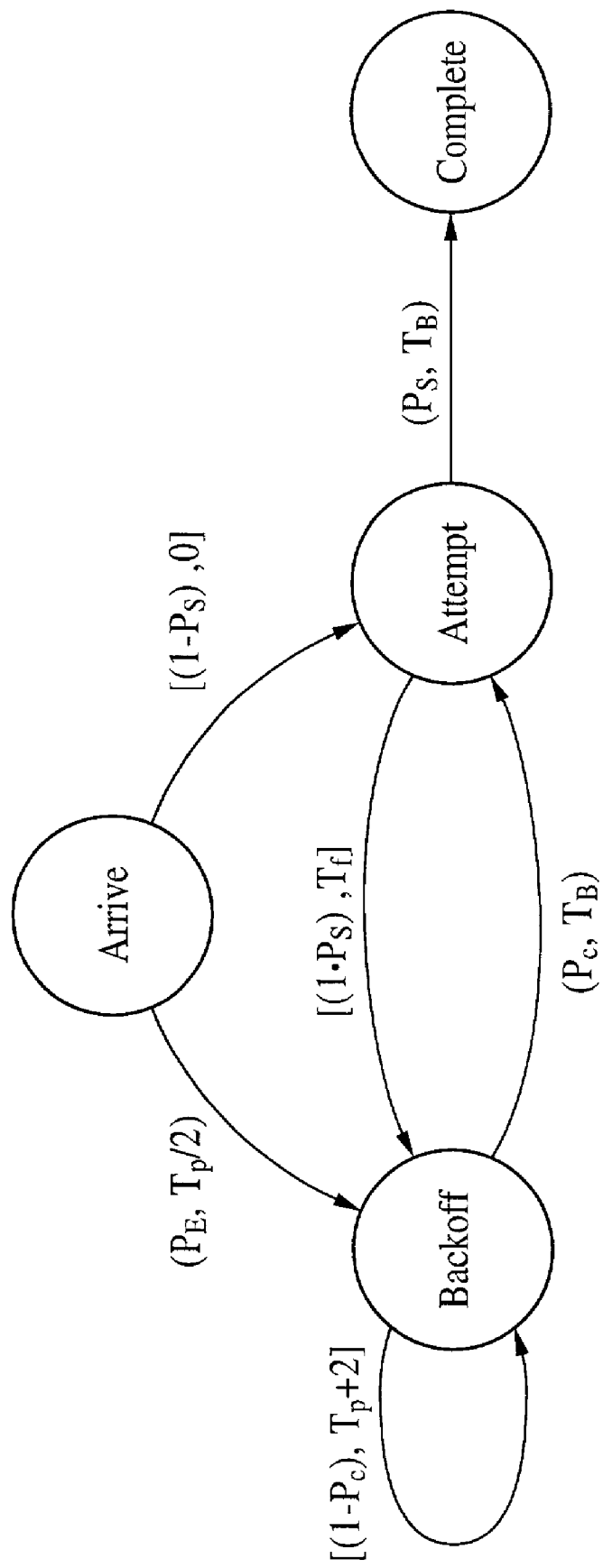
FIG. 10 is a state diagram showing a relationship between selected node states according to an embodiment of the RIMA collision-avoidance method of the present invention.

The average delays for RIMA-DP was determined since this protocol provided the best throughput amongst the MAC protocols based on receiver-initiated collision avoidance. It is necessary to recognize the transitions which a node follows according to the packet received as well as the probability with which each of those transitions occurs in order to calculate the average packet delays for a packet that is ready for transmission. As the inter-arrival times of the packets follow a Poisson distribution, the average delay may be calculated as a Markov process. It is assumed that four states exist in the model, comprising ARRIVE, BACKOFF, ATTEMPT, and COMPLETE, the transition between which are depicted in FIG. 10, with the transition from the ATTEMPT, to the COMPLETE state where the packet is assumed to be delivered. With probability $(1-P_S)$, the transmitting node fails and a failed transition period is length $T_F$ seconds occurs, after which the node transitions to the BACKOFF state.

The purpose of the BACKOFF state is to express the random waiting time that a node waits prior to contending for the channel again. The average waiting period is assumed to be given as $T_B$ seconds. After $T_B$ seconds have elapsed, the probability that the node will find the channel clear is $P_C$ and in this case a transition to the ATTEMPT state is performed. Otherwise the channel may be found busy with a probability of $(1-P_C)$ and the node remains in the BACKOFF state for a length of time equal to the average transmission period plus the average idle period. The average delay for a packet to transition from the ARRIVED state to the COMPLETE state is expressed as $\overline{D}$. If E(A) is the expected delay each time a node is in the ATTEMPT state, and E(B) is the expected delay every time a node is in the BACKOFF state, then $\overline{D}$ is given by:

$$\overline{D} = T_P + T_S - T_F - T_B - \overline{I} + P_B\left[T_B - \overline{I} - \frac{T_P}{2}\right] + \frac{T_B + T_F - T_P - \overline{I}}{P_S} + \frac{(P_B - 1)(T_P + \overline{I})}{P_C} + \frac{T_P + \overline{I}}{P_C P_S} \quad (26)$$

Substituting the appropriate values in Eq. 27 the average delay for RIMA-DP may be calculated. As previously described, $T_{S1}=3\gamma+\delta+4\tau=4\gamma+2\delta+11\tau$, and $P_{S1}$, is given in Eq. 14, $T_{S2}=3\gamma+\delta+4\tau$, and $P_{S2}$ is given in Eq. 15, therefore $T_S$ in RIMA-DP is given by:

$$T_S = \frac{1}{2}\left[(3\gamma + \delta + 4\tau) + \left(\frac{1}{N}\right)(\delta + \gamma + 7\tau)\right]e^{-\lambda\tau} \quad (27)$$

Eq. 13 yields $P_S$, and $\overline{U}$, and $\overline{I}$ have already been calculated for RIMA-DP, therefore, $P_B$ is equal to:

$$P_B = \frac{\gamma + 2\tau - \frac{1-e^{-\lambda\tau}}{\lambda} + \left[(3\gamma + \delta + 4\tau) + \left(\frac{1}{N}\right)(\delta + \gamma + 7\tau)\right]e^{-\lambda\tau}}{\frac{1}{\lambda} + \left[(3\gamma + \delta + 4\tau) + \left(\frac{1}{N}\right)(\delta + \gamma + 7\tau)\right]e^{-\lambda\tau}} \quad (28)$$

The probability $P_C$ is equal to the probability that there is no packet arrival during the waiting period, given by:

$$P_C = e^{-\lambda T_B} \quad (29)$$

For the sake of simplicity, it is assumed that $T_F=\gamma+\tau+\epsilon$ when a node fails to acquire exclusive use of the channel. The average transmission period $T_P$ is once again equal to an average busy period or $T_P=\overline{B}$. Substituting this information into Eq. 27 the average delay for a packet under RIMA-DP is found to be:

$$\overline{D}_{RIMA-DP} = \overline{B} + \frac{1}{2}\left[(3\gamma + \delta + 4\tau) + \left(\frac{1}{N}\right)(\delta + \gamma + 7\tau)\right]e^{-\lambda\tau} - \quad (30)$$

$$\gamma - 2\tau - \varepsilon - T_B - \overline{I} + P_B\left(T_B - \overline{I} - \frac{\overline{B}}{2}\right) + T_B + \gamma + \varepsilon +$$

$$2\tau - \overline{B} - \overline{I}e^{-\lambda T_B} + [(P_B - 1)(\overline{B} + \overline{I}) + (\overline{B} + \overline{I})e^{\lambda\tau}]e^{\lambda T_B}$$

For FAMA-NCS the average busy period is $$\overline{B} = \gamma + 2\tau - \frac{1-e^{\lambda\tau}}{\lambda} + e^{\lambda\tau}(2\gamma + \delta + 4\tau).$$

The duration for a successful busy period is, $T_S=3\gamma+\delta+4\tau$, while the duration of a failed busy is, $T_F=\gamma+\tau+\epsilon$. The average time spent in the BACKOFF state before a node attempts to acquire the floor again is, $T_B=5\gamma$. The probability of success is $P_S=e^{\lambda\tau}$. Lastly, $P_C=e^{-\lambda T_B}$, and by substituting these values into Eq. 27 the average delay for FAMA-NCS may be obtained.

Figure 11:
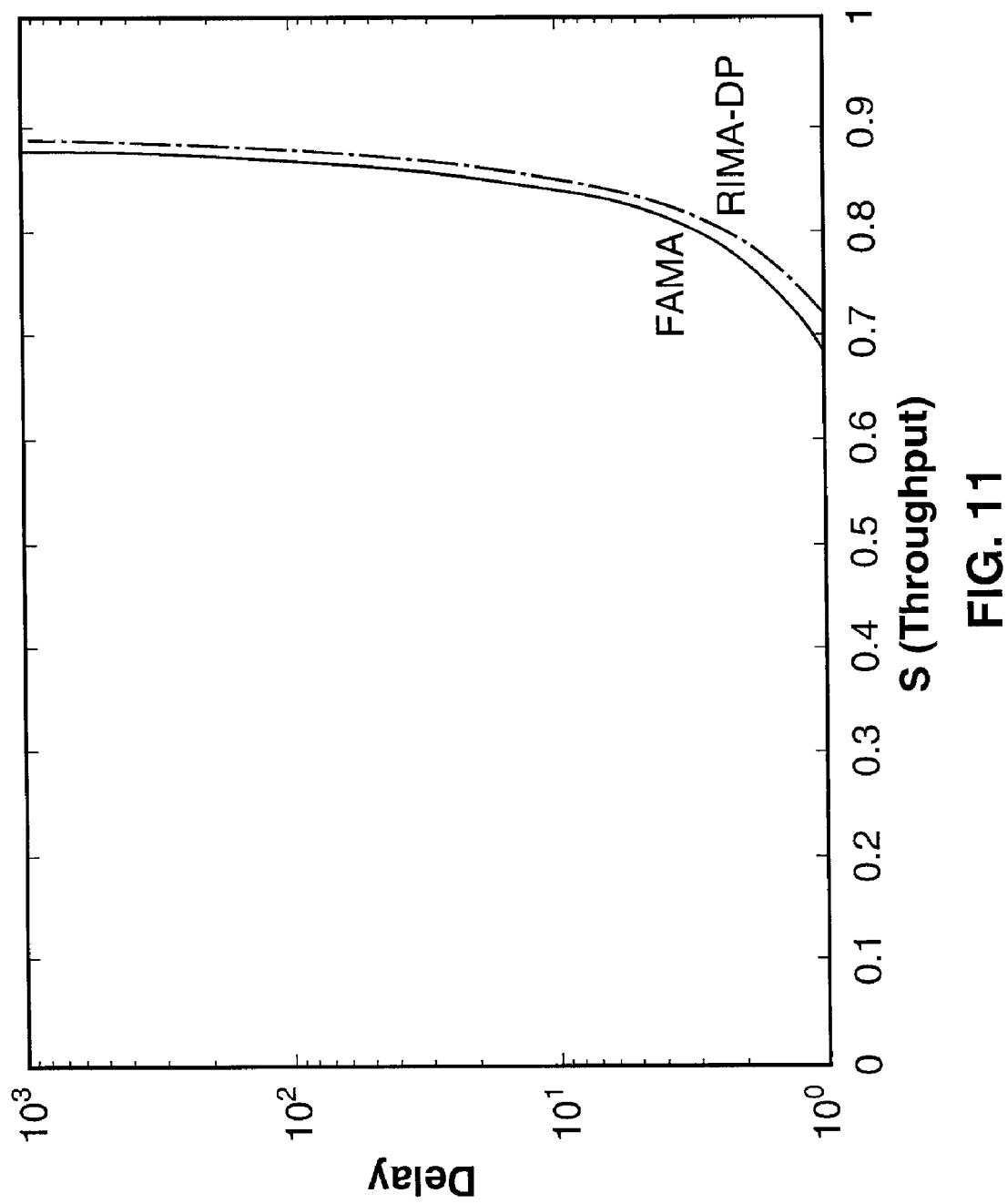
FIG. 11 is a graph of average delay, showing a comparison between a conventional FAMA-NCS collision-avoidance method and the RIMA-DP collision-avoidance method according to an aspect of the present invention.

FIG. 11 illustrates the average delay for FAMA-NCS and RIMA-DP, wherein it is assumed that $\tau=0.0001$, $\gamma=0.02$, $\epsilon=0.002$, and $T_B=5\times\gamma$. It can be seen, therefore, that RIMA-DP provides equal, or lower, average delays than available using the FAMA-NCS protocol.

5. Simulation Results

The analytical results were validated by performing simulation experiments to investigate the performance of RIMA-DP under different network topologies and to show how it compares in relation to CSMA and FAMA-NCS. The OPNET simulation tool was utilized for implementing the protocols. The results of the simulation tests are given in Table 2 for RIMA-DP, and FAMA-NCS, while available simulation results were utilized for MACAW from a paper published in the proceedings of *ACM SIGCOMM* in August of 1994 by V. Barghavan, S. Shenker, and L. Zhang entitled: "MACAW: A Media Access Protocol for Wireless LANs".

Figure 12A:
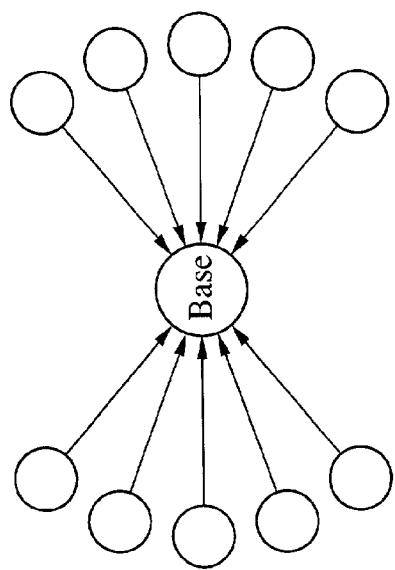
FIG. 12A is a diagram of node topology utilized in the simulation of collision-avoidance methods, showing nodes N1–N6 being directed to the same base station.
Figure 12B:
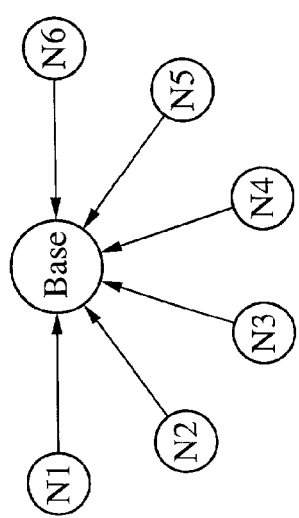
FIG. 12B is a diagram of node topology utilized in the simulation of collision-avoidance methods, showing two groups of five nodes each which are directed to a base station.
Figure 12C:
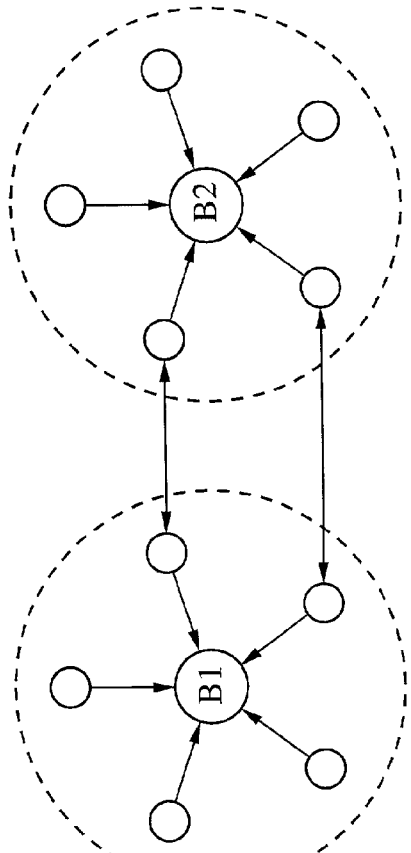
FIG. 12C is a diagram of node topology utilized in the simulation of collision-avoidance methods, showing two separate base stations with interconnected nodes of which two can interact.

The simulation experiments considered the use of single channel radios that are only capable of either receiving or transmitting data at a given time at a data rate of one megabit-per-second (1 Mb/S). Nodes are assumed to be approximately one mile apart from one another, giving a maximum propagation delay of five microseconds (5 μS). A transmit-to-receive turnaround time of twenty microseconds (20 μS) was included, while the time assumed for ramp-up and ramp-down of the radios was set for five microseconds (5 μS). FIG. 12A through FIG. 12C illustrate topologies utilized in the experiments, which are the same as those utilized in previous industry analysis of FAMA-NCS performance, which indicated that FAMA-NCS had improved performance in relation with other sender-initiated collision-avoidance protocols.

FIG. 12A is a fully-connected network topology in which all the traffic produced from nodes N1 to N6 are directed to the same base station. FIG. 12B depicts two groups of five nodes directed to a base station, wherein the nodes can hear each other within the same group but are otherwise hidden from all the nodes in the other group. Traffic is generated from all the nodes in each group with the destination being the central base station B1. FIG. 12C depicts two separate base stations B1 and B2 with a group of five nodes sending traffic to each one of them respectively. All the nodes within each group are hidden from the nodes in the other group with the exception of two nodes in each group that can interfere with their peers. Topology (d) shows a multi-hop network of eight nodes. The lines between the nodes illustrate the connectivity in the network whereas the lines with arrow denote unidirectional flows of traffic. A node is generating traffic that at least three other nodes will receive at any given time whereas there are always at least two other nodes that are hidden.

Data packets are generated according to a Poisson distribution and the data packet size is assumed to be equal to five hundred and twelve bytes (512 bytes), which renders a capacity of approximately two hundred forty four data-packets-per-second (244 dpps), excluding overhead. Table 2 lists the maximum throughput achieved by RIMA-DP, FAMA-NCS, and MACAW. It will be appreciated that for the fully-connected topology of FIG. 12(a), RIMA-DP achieves a maximum throughput of eighty three percent (83%), while FAMA-NCS achieves a seventy six percent (76%) throughput. RIMA-DP achieves a maximum throughput equal to, or exceeding, that of FAMA-NCS in all the topologies under consideration. It will be appreciated that the results of the simulation tests followed the predictions provided by the analytical models.

6. Conclusions

Collision-avoidance has been presented based at the receiver instead of the sender which demonstrates the required handshaking features to eliminate data packet collisions at the intended receiver in networks containing hidden terminals. The simple comparative analysis of throughput protocols for receiver-initiated multiple access protocols illustrated that a receiver-initiated collision-avoidance strategy can provide a higher efficiency that any of the sender-initiated strategies utilized or proposed to date. The proposed method of utilizing dual-purpose polling (RIMA-DP) was found to always provide improved performance in relation with sender-initiated collision avoidance methods.

Although RIMA protocols have been analyzed only for fully-connected networks, it should be appreciated that the analysis indicates which forms of collision-avoidance methods should be investigated further. It will also be appreciated that since RIMA protocols provide correct collision-avoidance even in topologies containing hidden terminals, that the relative performance differences also apply thereto, unlike the use of the conventional protocols which are unable to correctly avoid collisions when hidden terminals exist. It is apparent from the results obtained, that the proposed dual-purpose polling strategies directed to specific neighbors can yield the most promising results. Simulation experiments using OPNET confirm the results of the simple analytical model used and show that RIMA-DP achieves a higher maximum throughput than FAMA-NCS or MACAW in networks with hidden terminals.

Accordingly, it will be seen that this invention provides high throughput handshaking methods, RIMA, for use in ad-hoc wireless networks. It will be appreciated that a number of variants of the RIMA protocols may be implemented by one of ordinary skill in the art without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Normalized Variables

| | |
|---|---|
| $a = \dfrac{\tau}{\lambda}$ | Normalized propagation delay |
| $b = \dfrac{\gamma}{\lambda}$ | Normalized control packets |
| $G = \lambda \times \delta$ | Offered load, normalized to data packets |

TABLE 2

Simulation Results:
Maximum Throughput for Various Network Topologies

| Network | RIMA-DP | FAMA-NCS | MACAW |
|---|---|---|---|
| (a) | 0.83 | 0.76 | 0.63 |
| (b) | 0.58 | 0.58 | 0.49 |
| (c) (B1) | 0.76 | 0.74 | 0.45 |
| (c) (B2) | 0.76 | 0.74 | 0.39 |

What is claimed is:

1. A method of providing a medium access control protocol within a wireless network having a plurality of nodes communicating over a channel, comprising:

transmitting a data packet over said channel by a first node, after a first collision-avoidance delay interval, in response to receipt of a ready-to-receive control packet from a second node indicating that said second node is ready to receive a data packet; and canceling transmission of said data packet during said first collision-avoidance delay interval in response to receipt of a no-transmission-request control packet which indicates the detection of activity within said channel;

wherein said ready-to-receive control packet further indicates that said second node is requesting transmission of data to said first node;

wherein transmission of said data packet from said second node to said first node is responsive to the receipt of a clear-to-send control packet from said first node indicating that said second node is clear to send the data packet; and wherein said second collision-avoidance interval substantially equals or exceeds the time required for transmitting a ready-to-receive control packet plus seven times the maximum propagation delay between the nodes communicating over said channel.

2. A method as recited in claim 1, wherein said first collision-avoidance delay interval is set to at least the maximum propagation delay between the nodes communicating over said channel.

3. A method as recited in claim 1, wherein said clear-to-send control packet is of sufficient length that transmission thereof requires a length of time which exceeds the time for transmitting a ready-to-receive control packet by twice the maximum propagation delay between the nodes communicating over said channel.

4. A method as recited in claim 1:

wherein said first node is one of a plurality of nodes that have received said ready-to-receive control packet from said second node;

wherein transmission of said data packet from said second node is preceded by transmission of a clear-to-send control packet indicating that said second node is clear to send the data packet, followed by a second collision-avoidance interval; and further comprising canceling transmission from said second node to said first node, during said second collision-avoidance interval, in response to receipt of a no-transmission-request control packet.

5. A method as recited in claim 4, wherein said clear-to-send control packet is of sufficient length that transmission thereof requires a length of time which exceeds the time for transmitting a ready-to-receive control packet by twice the maximum propagation delay between the nodes communicating over said channel.

6. A method as recited in claim 1, wherein said channel of said wireless network is subject to the operation of hidden terminals.

7. A method as recited in claim 1, wherein each of said nodes communicating on said channel is adapted for detecting carrier within said channel.

8. A method of providing collision-avoidance within a medium access control protocol within a wireless network having a plurality of nodes communicating over a channel, comprising:

receiving within a first node, a ready-to-receive-or-transmit control packet from a neighboring second node;

transmitting a data packet from said first node to said second node, following a first collision-avoidance delay interval, if data is available in said first node;

canceling transmission of said data packet from said first node to said second node if a no-transmission-request control packet is received by said first node during said first collision-avoidance interval;

transmitting a clear-to-send control packet, followed by a second collision-avoidance interval, followed by a data packet from said second node to said first node, if said first node has no data available for transmission to said second node; and canceling transmission of said data packet from said second node to said first node if a no-transmission-request control packet is received by said second node during said second collision-avoidance interval;

wherein said second collision-avoidance interval substantially equals or exceeds the time required for transmitting a ready-to-receive control packet plus seven times the maximum propagation delay between the nodes communicating over said channel.

9. A method as recited in claim 8, wherein said first collision-avoidance delay interval is set to at least the maximum propagation delay between the nodes communicating over said channel.

10. A method as recited in claim 8, wherein said clear-to-send control packet is of sufficient length wherein transmission requires a length of time which exceeds the time for transmitting a ready-to-receive control packet by twice the maximum propagation delay between the nodes communicating over said channel.

11. A method as recited in claim 8, wherein said channel of said wireless network is subject to the operation of hidden terminals.

12. A method as recited in claim 8, wherein each of said nodes communicating on said channel is adapted for detecting carrier within said channel.

13. A method of providing receiver-initiated collision-avoidance as a medium access control protocol within a wireless network having a plurality of transceiver nodes communicating over a channel, wherein correct collision-avoidance may be provided despite the existence of hidden terminals within said network, comprising:

transmitting an RTR (ready-to-receive) control packet, or equivalent, by a first node to a neighboring second node;

said RTR control packet indicative of a receiver-initiated transmission request wherein said first node is ready to receive a data packet over said channel;

receiving said RTR control packet from said first node by said second node wherein said second node ponds for a sufficient first collision-avoidance interval;

transmitting an NTR (no-transmission-request) control packet, or equivalent, if channel activity is detected by said first node proximal to the sending of said RTR control packet;

said NTR control packet indicative that said second node is to cancel transmission of said data packet to avoid a data packet collision;

receiving said NTR control packet, or equivalent, by said second node to cancel the transmission of said data packet; and transmitting said data packet from said second node to said first node if no NTR control packet was received within said first collision-avoidance interval;

wherein said second collision-avoidance interval substantially equals or exceeds the time required for transmitting said RTR control packet plus seven times the maximum propapation delay between the nodes communicating over said channel.

14. A method as recited in claim 13, wherein said transceiver nodes comprise single-channel radios having carrier sense capability.

15. A method as recited in claim 13, wherein said first collision-avoidance delay interval is set to at least the maximum propagation delay between the nodes communicating over said channel.

16. A method as recited in claim 13, wherein said RTR control packet further indicates that said first node is requesting a sender-initiated data transmission if said second node has no data packets for transmitting to said first node, and further comprising:

transmitting a CTS control packet (clear-to-send), or equivalent, by said second node, if said second node has no data packets for transmitting to said first node;

wherein said CTS control packet indicates that said first node is requesting to transmit data to said second node, if said second node has no data for transmitting to said first node; and transmitting a data packet from said first node to said second node after receiving said CTS control packet.

17. A method as recited in claim 13, wherein transmission of said RTR control packet is from said first node to said second node along with at least one additional neighboring nodes of said first node, and further comprising:

transmitting an RTS control packet (ready-to-send) by said neighbors of said first node which have at least one data packet for transmitting to said first node; and monitoring for an NTR control packet from said first node during a second collision-avoidance interval prior to transmitting of said data packet to said first node.

18. A method of providing a medium access control protocol within a wireless network having a plurality of nodes communicating over a channel, comprising:

transmitting a data packet over said channel by a first node, after a first collision-avoidance delay interval, in response to receipt of a ready-to-receive control packet from a second node indicating that said second node is ready to receive a data packet;

canceling transmission of said data packet during said first collision-avoidance delay interval in response to receipt of a no-transmission-request control packet which indicates the detection of activity within said channel;

wherein said first node is one of a plurality of nodes that have received said ready-to-receive control packet from said second node;

wherein transmission of said data packet from said second node is preceded by transmission of a clear-to-send control packet indicating that said second node is clear to send the data packet, followed by a second collision-avoidance interval; and canceling transmission from said second node to said first node, during said second collision-avoidance interval, in response to receipt of a no-transmission-request control packet;

wherein said second collision-avoidance interval substantially equals or exceeds the time required for transmitting a ready-to-receive control packet plus seven times the maximum propagation delay between the nodes communicating over said channel.

* * * * *